(12) United States Patent
Xu et al.

(10) Patent No.: US 12,323,859 B2
(45) Date of Patent: Jun. 3, 2025

(54) METHOD AND APPARATUS FOR MULTICAST-BROADCAST SERVICE AREA CONTROL IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 355 days.

(21) Appl. No.: 17/759,763

(22) PCT Filed: Feb. 3, 2021

(86) PCT No.: PCT/KR2021/001418
§ 371 (c)(1),
(2) Date: Jul. 29, 2022

(87) PCT Pub. No.: WO2021/158012
PCT Pub. Date: Aug. 12, 2021

(65) Prior Publication Data
US 2023/0108178 A1    Apr. 6, 2023

(30) Foreign Application Priority Data
Feb. 3, 2020   (KR) .......................... 10-2020-0012471

(51) Int. Cl.
*H04W 36/00*     (2009.01)
*H04L 12/18*     (2006.01)
*H04W 36/06*     (2009.01)

(52) U.S. Cl.
CPC ..... *H04W 36/0007* (2018.08); *H04L 12/1868* (2013.01); *H04W 36/00837* (2018.08); *H04W 36/06* (2013.01)

(58) Field of Classification Search
CPC ... H04W 36/0007; H04W 36/06; H04W 4/06; H04W 72/30; H04W 36/008375; H04W 36/00837; H04L 12/1868
See application file for complete search history.

(56) References Cited

U.S. PATENT DOCUMENTS

| 7,379,738 B2 | 5/2008 | Balasubramanian et al. |
| 2010/0058133 A1* | 3/2010 | Lee ....................... H04L 1/1854 |
| | | 370/312 |

(Continued)

FOREIGN PATENT DOCUMENTS

| KR | 10-1988459 | 6/2019 |
| WO | 2019-241235 | 12/2019 |

OTHER PUBLICATIONS

3GPP TS 38.401 V16.0.0 (Dec. 2019) (Year: 2019).*

(Continued)

*Primary Examiner* — Mohammad S Anwar
(74) *Attorney, Agent, or Firm* — LEE, HONG, DEGERMAN, KANG & WAIMEY

(57) ABSTRACT

The present disclosure relates to multicast-broadcast service (MBS) area control in wireless communications. According to an embodiment of the present disclosure, a method performed by a distributed unit (DU) in a wireless communication system comprises: transmitting, to a central unit (CU), information informing multicast-broadcast service (MBS) areas supported by the DU; receiving, from the CU, configurations for one or more MBS areas comprising a configuration for a first MBS area and a configuration for a second MBS area; providing an MBS service to a plurality of wireless devices based on the configuration for the first (Continued)

MBS area; receiving, from the plurality of wireless devices, feedback information for the first MBS area; transmitting, to the CU, a status message comprising an identity (ID) of the first MBS area and information obtained from the feedback information for the first MBS area; receiving, from the CU, a message for requesting a change of an MBS area, wherein the message comprises information for the second MBS area; and providing an MBS service based on the configuration for the second MBS area.

12 Claims, 25 Drawing Sheets

(56) References Cited

U.S. PATENT DOCUMENTS

| | | | |
|---|---|---|---|
| 2011/0069772 A1* | 3/2011 | Vrzic | H04L 1/0656 375/267 |
| 2016/0119762 A1 | 4/2016 | Zhu et al. | |
| 2016/0142948 A1* | 5/2016 | Bergstr?m | H04W 24/08 370/332 |
| 2018/0103437 A1 | 4/2018 | Kommi et al. | |
| 2019/0387444 A1 | 12/2019 | Byun et al. | |
| 2021/0185566 A1* | 6/2021 | Zhu | H04W 4/70 |

OTHER PUBLICATIONS

PCT International Application No. PCT/KR2021/001418, International Search Report dated May 17, 2021, 2 pages.

3rd Generation Partnership Project, "Technical Specification Group Services and System Aspects; Study on architectural enhancements for 5G multicast-broadcast services (Release 17)," 3GPP TR 23.757 V0.3.0, Jan. 2020, 37 pages.

3rd Generation Partnership Project, "Technical Specification Group Radio Access Network; NG-RAN; F1 application protocol (F1AP) (Release 15)," 3GPP TS 38.473 V15.7.0, Sep. 2019, 221 pages.

Ericsson, "Rat dependent positioning methods—architecture and protocol aspects," R2-1913423, 3GPP TSG-RAN WG2 Meeting #107bis, Oct. 2019, 14 pages.

Huawei et al., "WID revision: NR Multicast and Broadcast Services," RP-201038, 3GPP TSG RAN Meeting #88-e, E-meeting Jul. 2020, 6 pages.

Huawei, "NR Multicast and Broadcast Services, " RP-201868, 3GPP TSG RAN meeting #89-e, Electronic Meeting, Sep. 2020, 10 pages.

* cited by examiner

METHOD AND APPARATUS FOR MULTICAST-BROADCAST SERVICE AREA CONTROL IN WIRELESS COMMUNICATION SYSTEM

CROSS-REFERENCE TO RELATED APPLICATION(S)

This application is the National Stage filing under 35 U.S.C. 371 of International Application No. PCT/KR2021/001418, filed on Feb. 3, 2021, which claims the benefit of earlier filing date and right of priority to Korean Application No. 10-2020-0012471, filed on Feb. 3, 2020, the contents of which are all hereby incorporated by reference herein in their entireties.

TECHNICAL FIELD

The present disclosure relates to multicast-broadcast service (MBS) area control in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In some situations in wireless communications, multicast and/or broadcast communication scheme may be efficient rather than unicast communication system. Broadcast refers to a communication scheme in which a packet is delivered to all the host connected to the network, whereas multicast refers to a communication scheme in which a packet is delivered to intended recipients only. The collective term for the broadcast service and the multicast service is multicast-broadcast service (MBS). The MBS service can be provided in MBS area.

SUMMARY

1. Technical Problem

An aspect of the present disclosure is to provide method and apparatus for MBS area control in a wireless communication system.

Another aspect of the present disclosure is to provide method and apparatus for a dynamic control of MBs area in a wireless communication system.

Another aspect of the present disclosure is to provide method and apparatus for MBS area control in CU-DU split structure in a wireless communication system.

Another aspect of the present disclosure is to provide method and apparatus for signalings between the CU and the DU for MBS area control in a wireless communication system.

2. Technical Solution

According to an embodiment of the present disclosure, a method performed by a distributed unit (DU) in a wireless communication system comprises: transmitting, to a central unit (CU), information informing multicast-broadcast service (MBS) areas supported by the DU; receiving, from the CU, configurations for one or more MBS areas comprising a configuration for a first MBS area and a configuration for a second MBS area; providing an MBS service to a plurality of wireless devices based on the configuration for the first MBS area; receiving, from the plurality of wireless devices, feedback information for the first MBS area; transmitting, to the CU, a status message comprising an identity (ID) of the first MBS area and information obtained from the feedback information for the first MBS area; receiving, from the CU, a message for requesting a change of an MBS area, wherein the message comprises information for the second MBS area; and providing an MBS service based on the configuration for the second MBS area.

According to an embodiment of the present disclosure, a distributed unit (DU) in a wireless communication system comprises: a transceiver; a memory; and at least one processor operatively coupled to the transceiver and the memory, and configured to: transmit, to a central unit (CU), information informing multicast-broadcast service (MBS) areas supported by the DU; receive, from the CU, configurations for one or more MBS areas comprising a configuration for a first MBS area and a configuration for a second MBS area; provide an MBS service to a plurality of wireless devices based on the configuration for the first MBS area; receive, from the plurality of wireless devices, feedback information for the first MBS area; transmit, to the CU, a status message comprising an identity (ID) of the first MBS area and information obtained from the feedback information for the first MBS area; receive, from the CU, a message for requesting a change of an MBS area, wherein the message comprises information for the second MBS area; and provide an MBS service based on the configuration for the second MBS area.

According to an embodiment of the present disclosure, a method performed by a wireless device in a wireless communication system comprises: receiving, from a distributed unit (DU), a transmission of a multicast-broadcast service (MBS) service based on a configuration for a first MBS area; transmitting, to the DU, feedback information for the first MBS area; and receiving, from the DU, a transmission of an MBS service based on a configuration for a second MBS area, wherein the first MBS area is changed to the second MBS area based on information obtained from the feedback information for the first MBS area.

According to an embodiment of the present disclosure, a wireless device in a wireless communication system comprises: a transceiver; a memory; and at least one processor operatively coupled to the transceiver and the memory, and configured to control the transceiver to: receive, from a distributed unit (DU), a transmission of a multicast-broadcast service (MBS) service based on a configuration for a first MBS area; transmit, to the DU, feedback information for the first MBS area; and receive, from the DU, a transmission of an MBS service based on a configuration for a second MBS area, wherein the first MBS area is changed to the second MBS area based on information obtained from the feedback information for the first MBS area.

3. Advantageous Effect

The present disclosure can have various advantageous effects.

For example, gNB-CU can properly and dynamically perform changing the MBS service areas based on the UEs' and/or DUs' feedback information. Therefore, the radio resource for multicast/broadcast can be used efficiently, and also the multicast service can be more accurate for the proper UEs.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
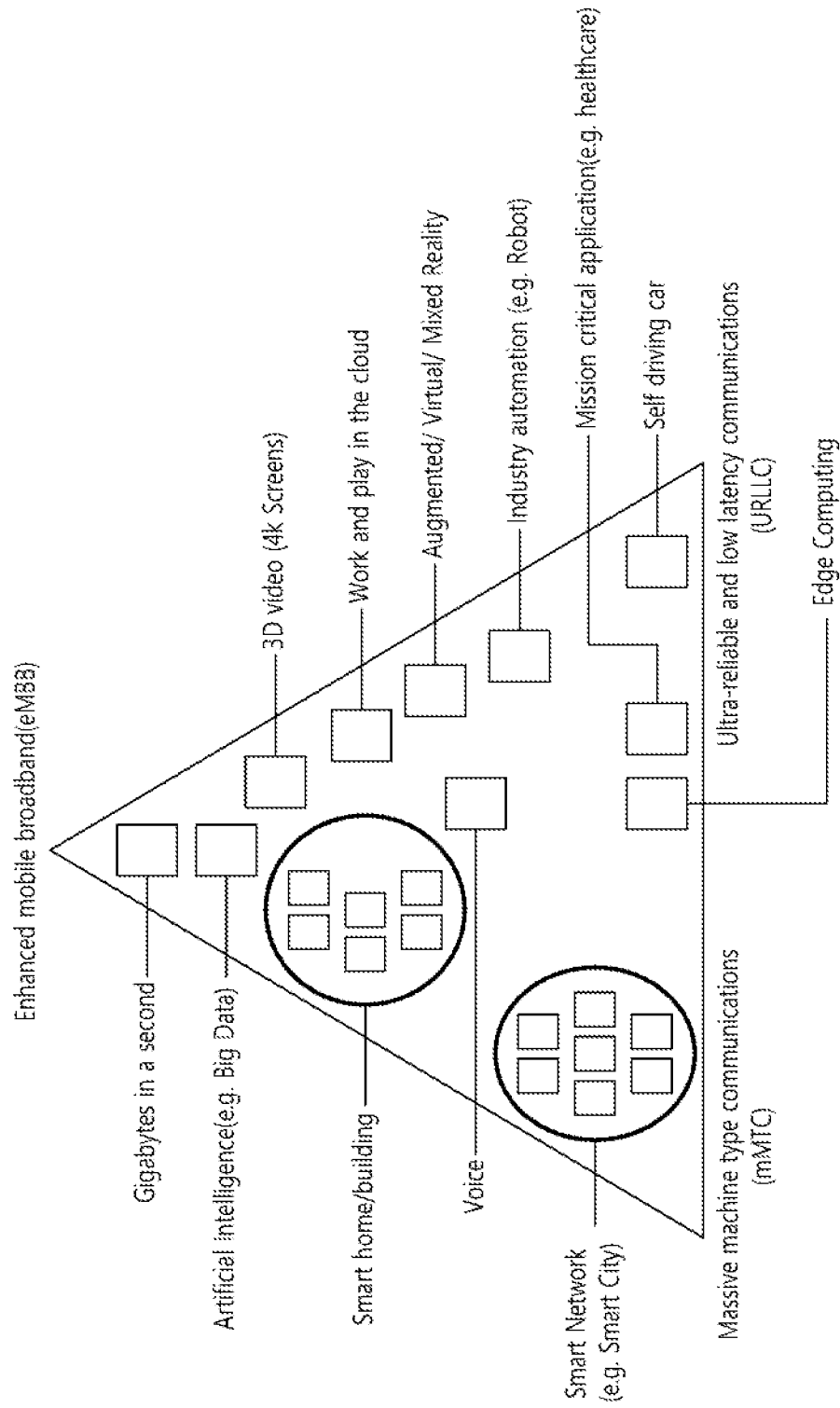
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

"multicast and broadcast service (MBS) area" refers to an area in which an MBS service is provided. An MBS area may consist of one or more component areas. A component area may comprise at least one of a cell, a tracking area (TA), a radio access network (RAN) area, a beam, or a transmission and reception point (TRP). Therefore, an MBS area may be defined by one or more of cell identities (IDs), TA identity (TAI) IDs, RAN area condes (RANACs), beam IDs and/or TRP IDs, whereas a component area may be defined by at least one of a cell ID, a TAI ID, a RANAC, a beam ID, or a TRP ID. In other words, an MBS area may comprise one or more of cell IDs, TAI IDs, RANACs, beam IDs and/or TRP IDs, whereas a component area may comprise at least one of a cell ID, a TAI ID, a RANAC, a beam ID, or a TRP ID.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', 'channel state/reference signal received power (RSRP)' and 'reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz–6000 MHz | 15, 30, 60 kHz |
| FR2 | 24250 MHz–52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz–7125 MHz | 15, 30, 60 kHz |
| FR2 | 24250 MHz–52600 MHz | 60, 120, 240 kHz |

Figure 2:
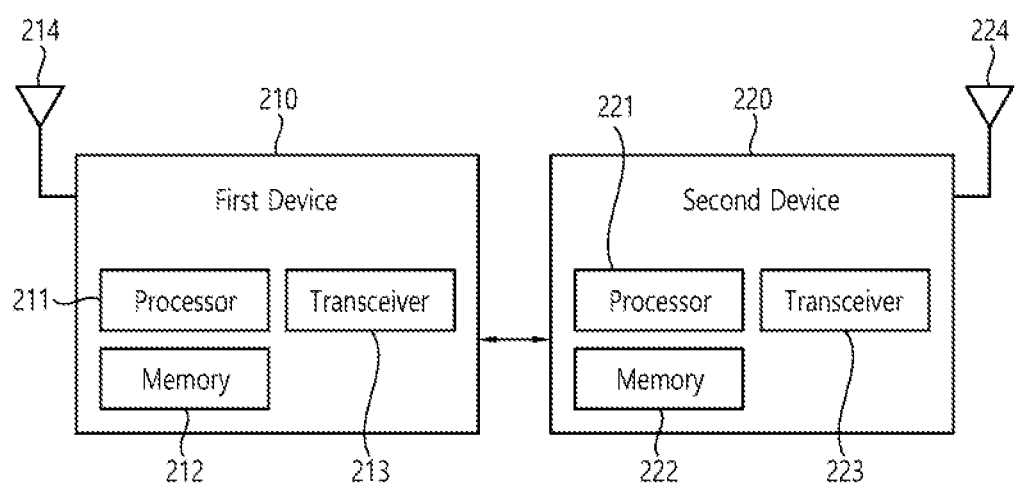
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
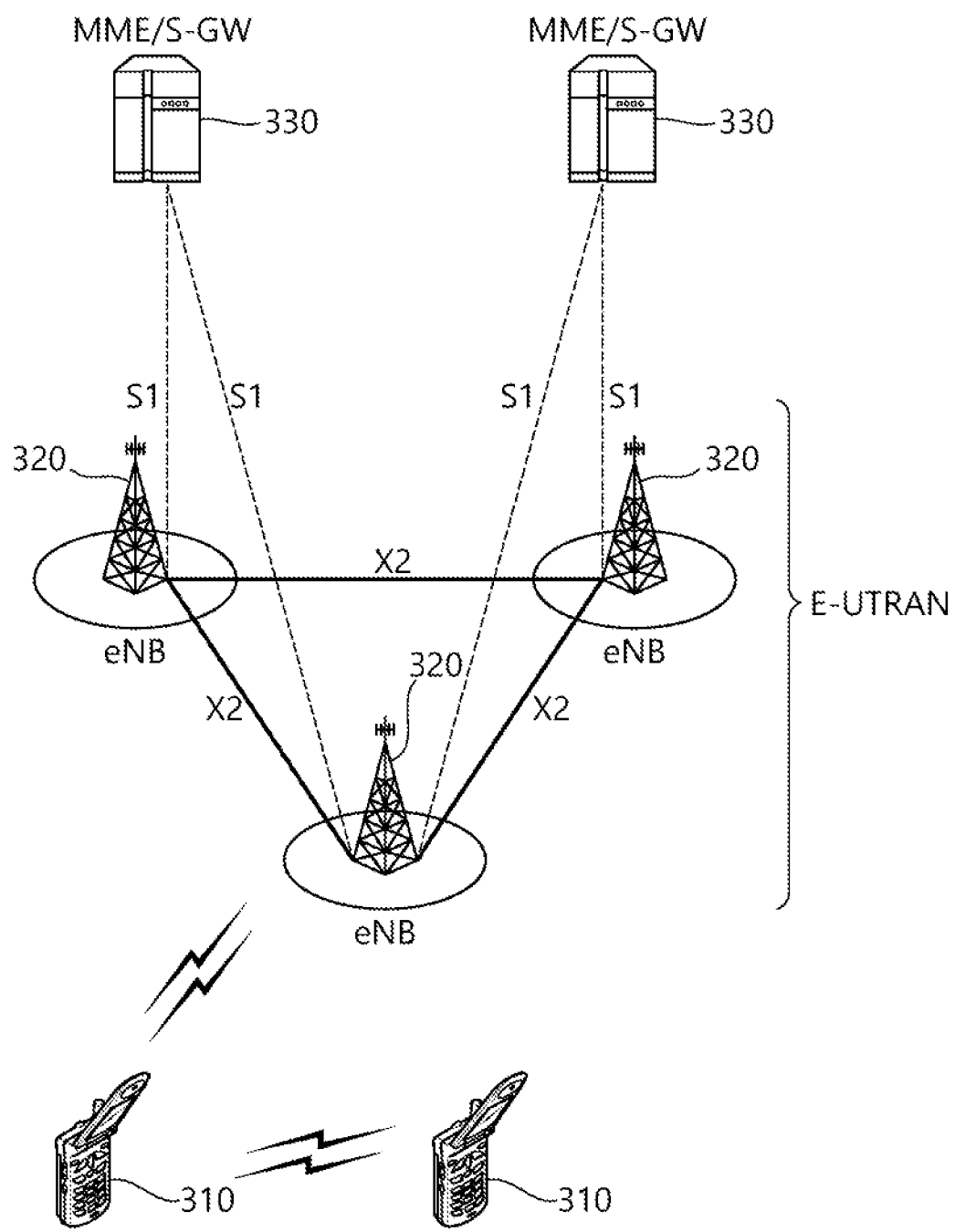
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), abase transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
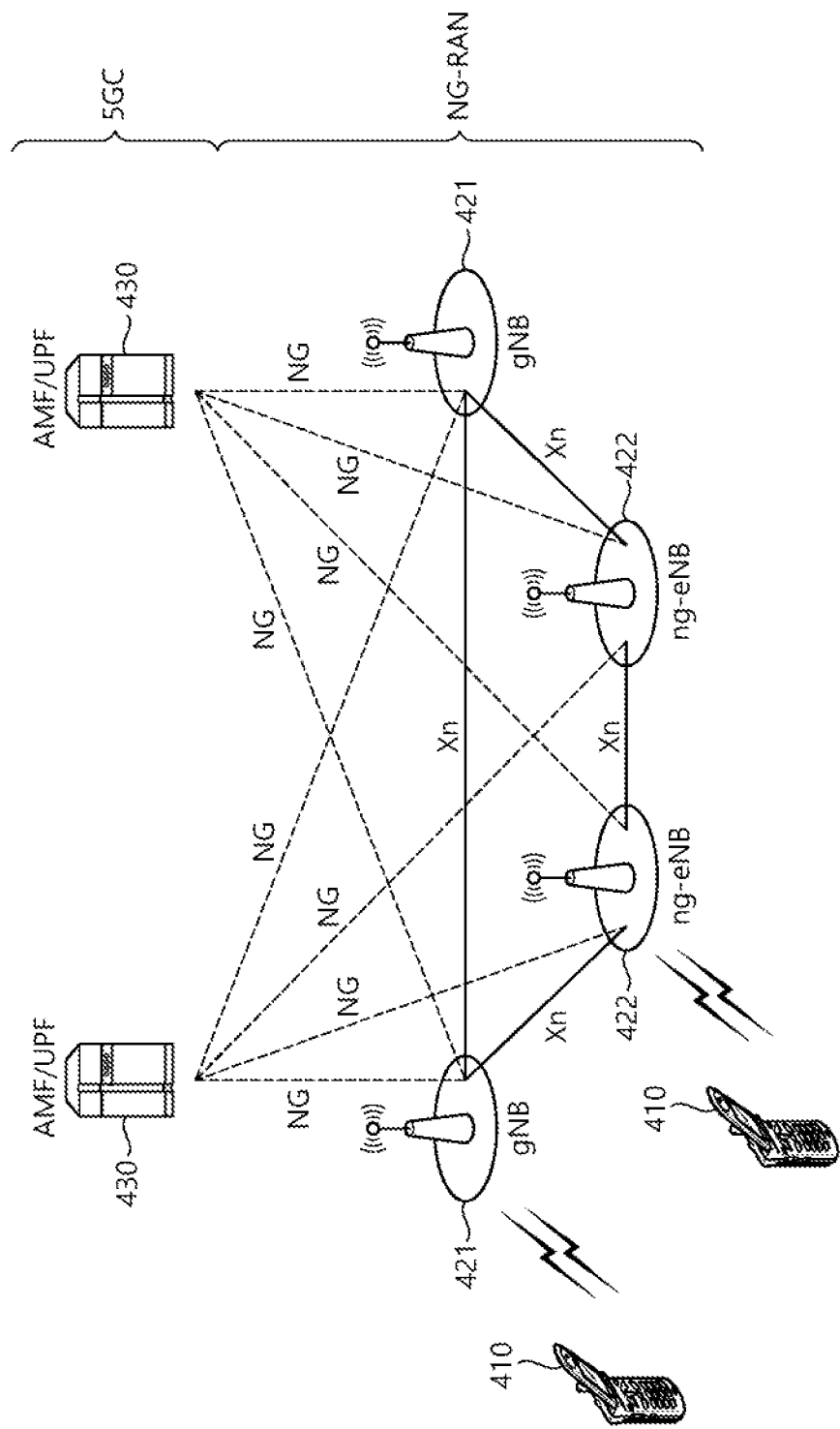
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
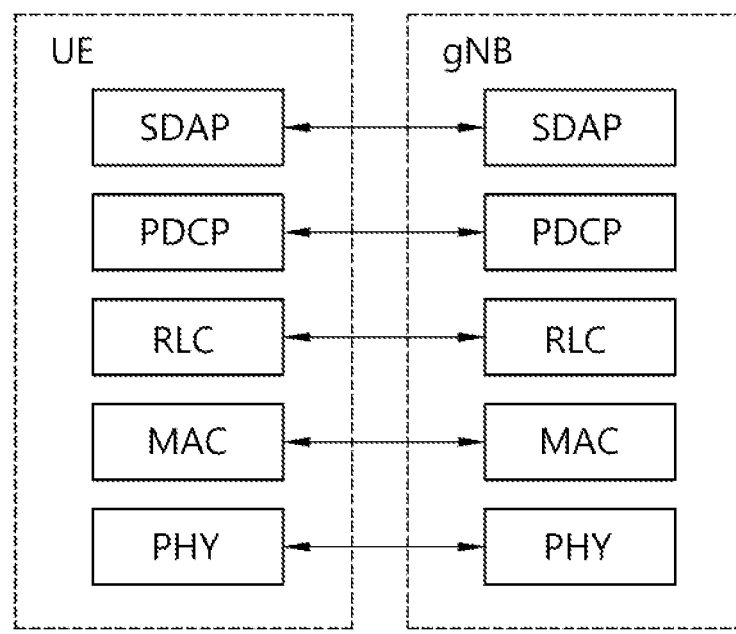
FIG. 5 shows a block diagram of a user plane protocol stack to which the technical features of the present disclosure can be applied.
Figure 6:
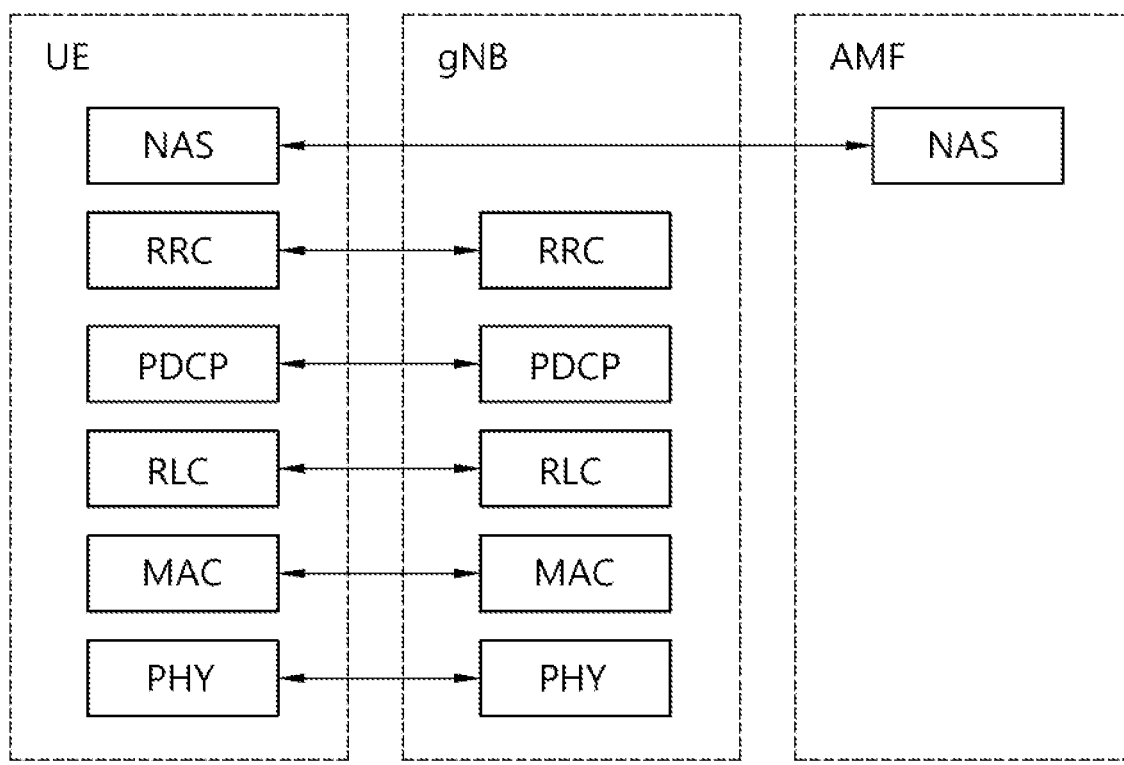
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
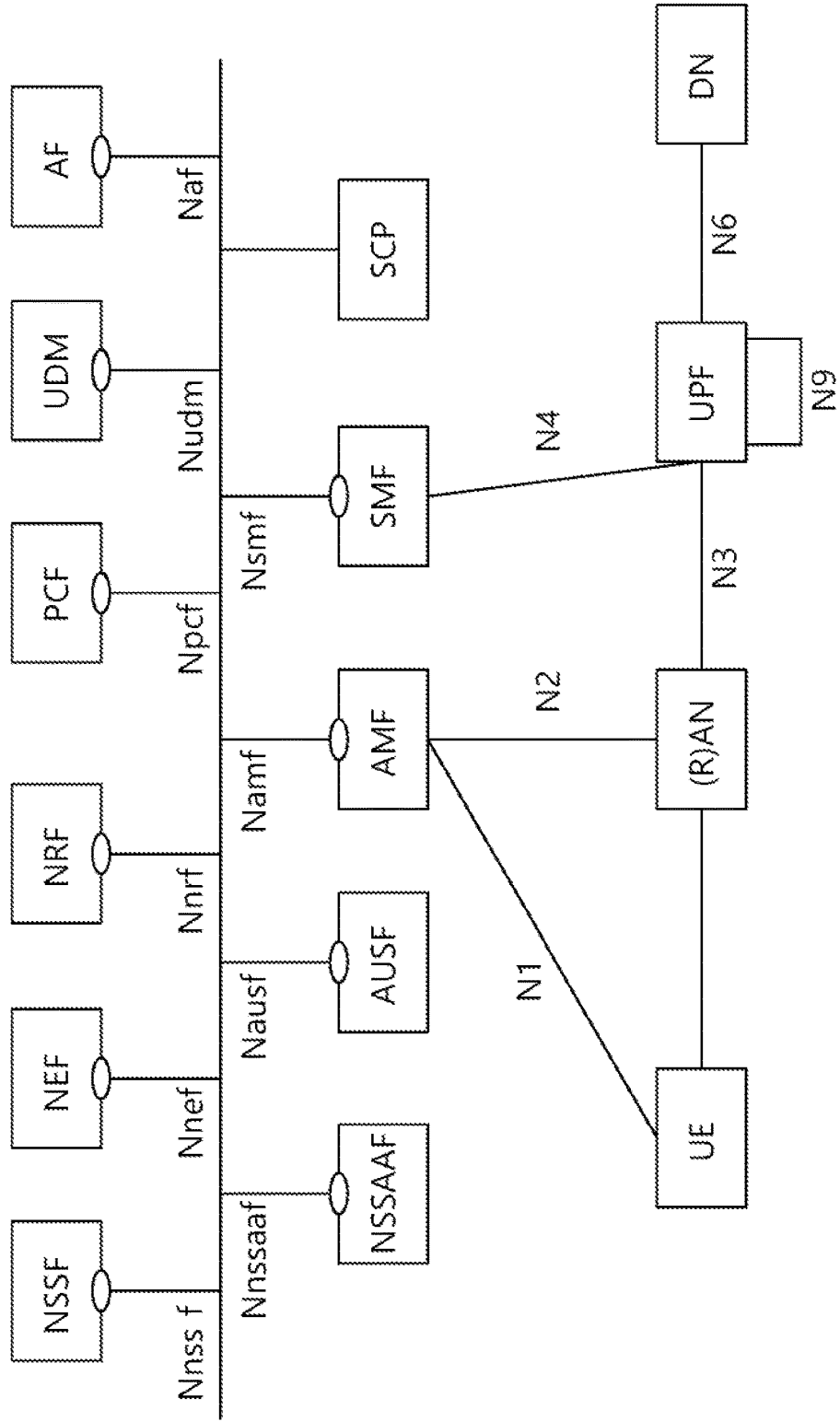
FIG. 7 shows an example of a system architecture for a communication system to which technical features of the present disclosure can be applied.

FIG. 7 shows an example of a system architecture for a communication system to which technical features of the present disclosure can be applied. An example of the communication system may comprise a 5G system and/or NR system.

Referring to FIG. 7, the communication system may comprise various core network entities, such as an access and mobility management function (AMF), a session management function (SMF), a user plane function (UPF), a policy control function (PCF), an authentication server function (AUSF), a unified data management (UDM), an application function (AF), a network exposure function (NEF), a network function repository function (NRF), a network slice selection function (NSSF), a network slice specific authentication and authorization function (NSSAAF) and a service communication proxy (SCP).

The AMF may support a termination of non-access stratum (NAS) signalling, NAS ciphering & integrity protection, registration management, connection management, mobility management, access authentication and authorization, security context management. The AMF may be associated with N1, N2 and Namf. The N1 is a reference point between the UE and the AMF. The N2 is a reference point between the RAN and the AMF. The Namf is a service-based interface exhibited by the AMF.

The SMF may support a session management (session establishment, modification, release), UE internet protocol (IP) address allocation & management, dynamic host configuration protocol (DHCP) functions, termination of NAS signalling related to session management, DL data notification, traffic steering configuration for UPF for proper traffic routing. The SMF may be associated with N4 and Nsmf. The N4 is a reference point between the SMF and the UPF. The Nsmf is a service-based interface exhibited by the SMF.

The UPF may support packet routing & forwarding, packet inspection, quality of service (QoS) handling, acts as external protocol data unit (PDU) session point of interconnect to Data Network (DN), and may be an anchor point for intra- & inter-radio access technology (RAT) mobility. The UPF may be associated with N3, N4, N6 and N9. The N3 is a reference point between the RAN and the UPF. The N6 is a reference point between the UPF and the DN. The N9 is a reference point between two UPFs.

The PCF may support unified policy framework, providing policy rules to control plane (CP) functions, access subscription information for policy decisions in a unified data repository (UDR). The PCF may be associated with Npcf. The Npcf is a service-based interface exhibited by the PCF.

The AUSF may act as an authentication server. The AUSF may be associated with Nausf. The Nausf is a service-based interface exhibited by the AUSF.

The UDM may support generation of Authentication and Key Agreement (AKA) credentials, user identification handling, access authorization, subscription management. The UDM may be associated with Nudm. The Nudm is a service-based interface exhibited by the UDM.

The AF may support application influence on traffic routing, accessing NEF, interaction with policy framework for policy control. The AF may be associated with Naf. The Naf is a service-based interface exhibited by the AF.

The NEF may support exposure of capabilities and events, secure provision of information from external application to 3GPP network, translation of internal/external information. The NEF may be associated with Nnef. The Nnef is a service-based interface exhibited by the NEF.

The NRF may support service discovery function, maintains NF profile and available NF instances. The NRF may be associated with Nnrf. The Nnrf is a service-based interface exhibited by the NRF.

The NSSF may support selecting of the Network Slice instances to serve the UE, determining the allowed network slice selection assistance information (NSSAI), determining the AMF set to be used to serve the UE. The NSSF may be associated with Nnssf. The Nnssf is a service-based interface exhibited by the NSSF.

The NSSAAF may support Network Slice-Specific Authentication and Authorization with a AAA Server (AAA-S). If the AAA-S belongs to a third party, the NSSAAF may contact the AAA-S via an a AAA proxy (AAA-P). The NSSAAF may be associated with Nnssaaf. The Nnssaaf is a service-based interface exhibited by the NSSAAF.

The SCP may support indirect communication, delegated discovery, message forwarding and routing to destination network function (NF)/NF service, Message forwarding and routing to a next hop SCP, communication security (e.g. authorization of the NF Service Consumer to access the NF Service Producer API), load balancing, monitoring, overload control, optionally interact with UDR, to resolve the UDM Group ID/UDR Group ID/AUSF Group ID/PCF Group ID/charging function (CHF) Group ID/home subscriber server (HSS) Group ID based on UE identity (e.g., subscription permanent identifier (SUPI) or international mobility subscriber identity (IMPI)/IP multimedia public identity (IMPU)).

Figure 8:
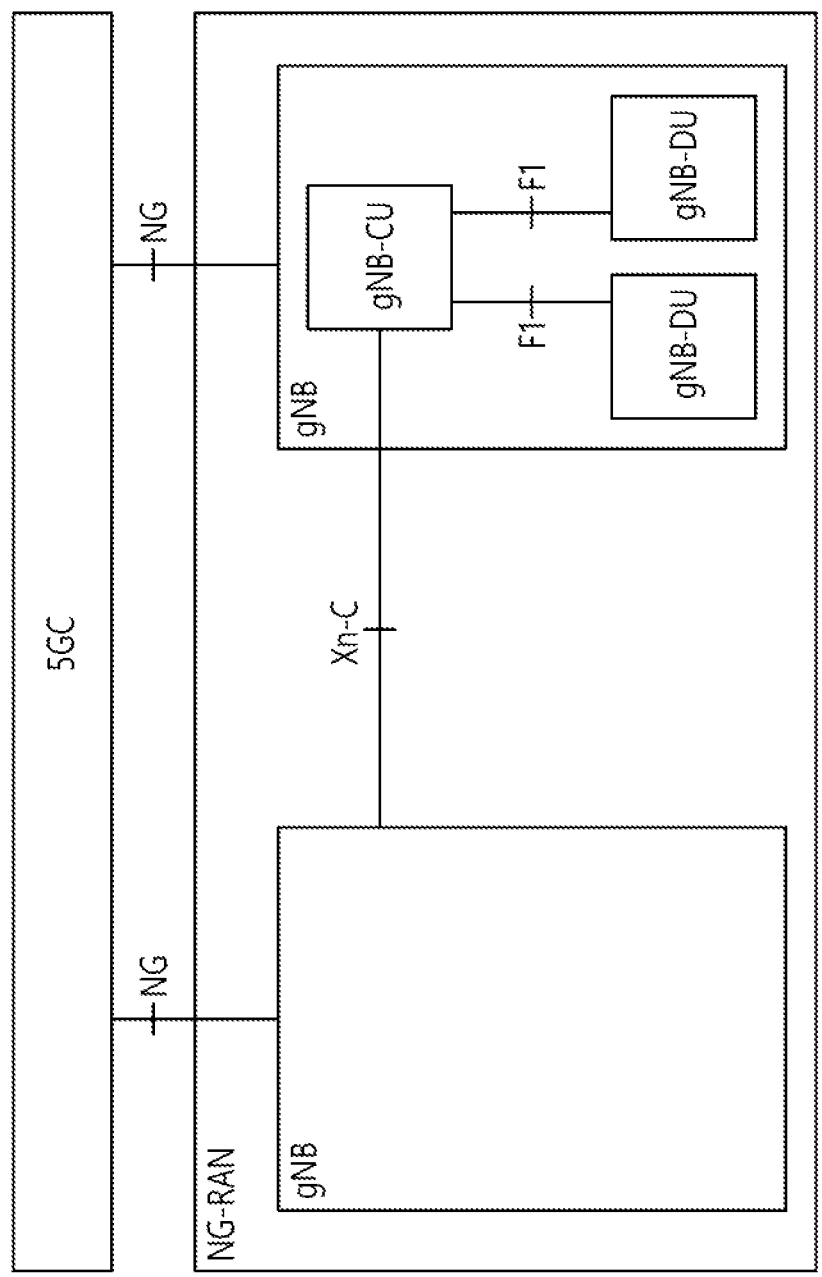
FIG. 8 shows an example of the overall architecture of an NG-RAN to which technical features of the present disclosure can be applied.

FIG. 8 shows an example of the overall architecture of an NG-RAN to which technical features of the present disclosure can be applied.

Referring to FIG. 8, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU.

The mapping between QoS flows and radio bearers is performed by gNB-CU and the granularity of bearer related management over F1 is radio bearer level. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

Figure 9:
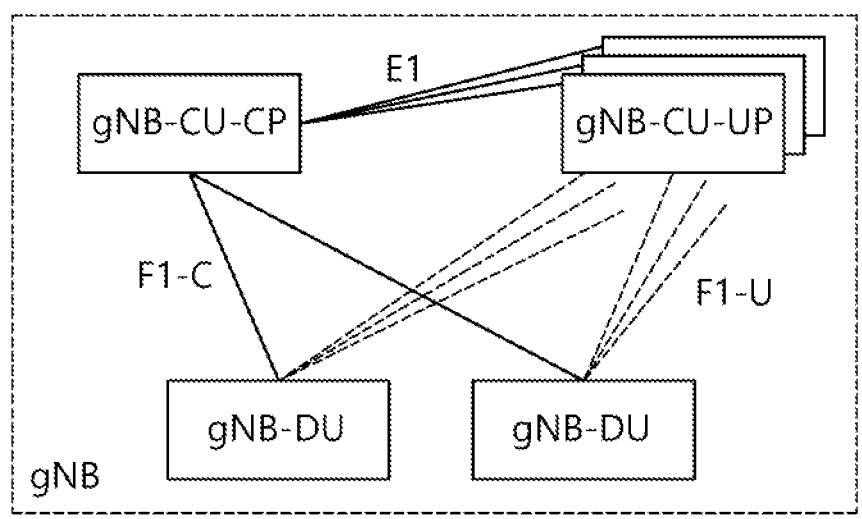
FIG. 9 shows an example of overall architecture for separation of gNB-CU-control plane (gNB-CU-CP) and gNB-CU-user plane (gNB-CU-UP) to which technical features of the present disclosure can be applied.

FIG. 9 shows an example of overall architecture for separation of gNB-CU-control plane (gNB-CU-CP) and gNB-CU-user plane (gNB-CU-UP) to which technical features of the present disclosure can be applied.

Referring to FIG. 9, a gNB may include a gNB-CU-CP, multiple gNB-CU-UPs and multiple gNB-DUs. A gNB-CU-CP may be simply referred to as CU-CP and a gNB-CU-UP may be simply referred to as CU-UP. The gNB-CU-CP and the gNB-CU-UP may be included in gNB-CU.

The gNB-CU-CP may be a logical node hosting an RRC and a control plane part of a PDCP protocol of the gNB-CU for a gNB. As illustrated, the gNB-CU-CP is connected to the gNB-DU through F1-C interface. The gNB-CU-CP terminates an E1 interface connected with the gNB-CU-UP and the F1-C interface connected with the gNB-DU.

The gNB-CU-UP may be a logical node hosting a user plane part of the PDCP protocol of the gNB-CU for a gNB, and the user plane part of the PDCP protocol and a SDAP protocol of the gNB-CU for a gNB. As illustrated, the gNB-CU-UP is connected to the gNB-DU through F1-U interface, and is connected to the gNB-CU-CP through the E1 interface. The gNB-CU-UP terminates the E1 interface connected with the gNB-Cu-CP and the F1-U interface connected with the gNB-DU.

According to an illustration shown in FIG. 9, the following properties may hold:
(1) A gNB-DU may be connected to a gNB-CU-CP.
(2) A gNB-CU-UP may be connected to a gNB-CU-CP.
(3) A gNB-DU can be connected to multiple gNB-CU-UPs under the control of the same gNB-CU-CP (i.e., the gNB-CU-CP to which the gNB-DU is connected and the multiple gNB-CU-UPs are connected).
(4) A gNB-CU-UP can be connected to multiple DUs under the control of the same gNB-CU-CP (i.e., the gNB-CU-CP to which the gNB-CU-UP is connected and the multiple DUs are connected).

Figure 10:
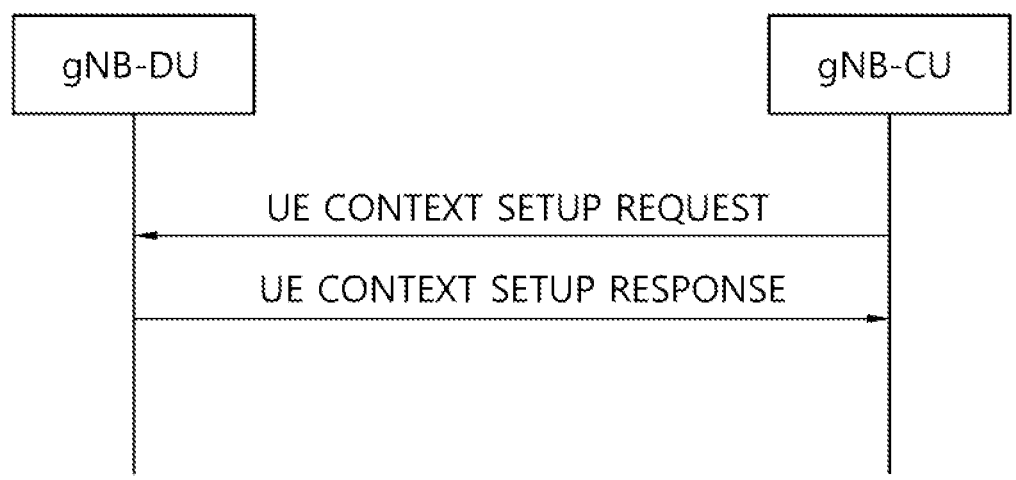
FIG. 10 shows an example of a UE context setup procedure to which technical features of the present disclosure can be applied.

FIG. 10 shows an example of a UE context setup procedure to which technical features of the present disclosure can be applied.

The purpose of the UE Context Setup procedure may be to establish the UE Context including, among others, signalling radio bearer (SRB), and data radio bearer (DRB_ configuration. The procedure may use UE-associated signalling.

The gNB-CU may initiate the procedure by sending UE CONTEXT SETUP REQUEST message to the gNB-DU. If the gNB-DU succeeds to establish the UE context, the gNB-DU may reply to the gNB-CU with UE CONTEXT SETUP RESPONSE. If no UE-associated logical F1-connection exists, the UE-associated logical F1-connection shall be established as part of the procedure.

Figure 11:
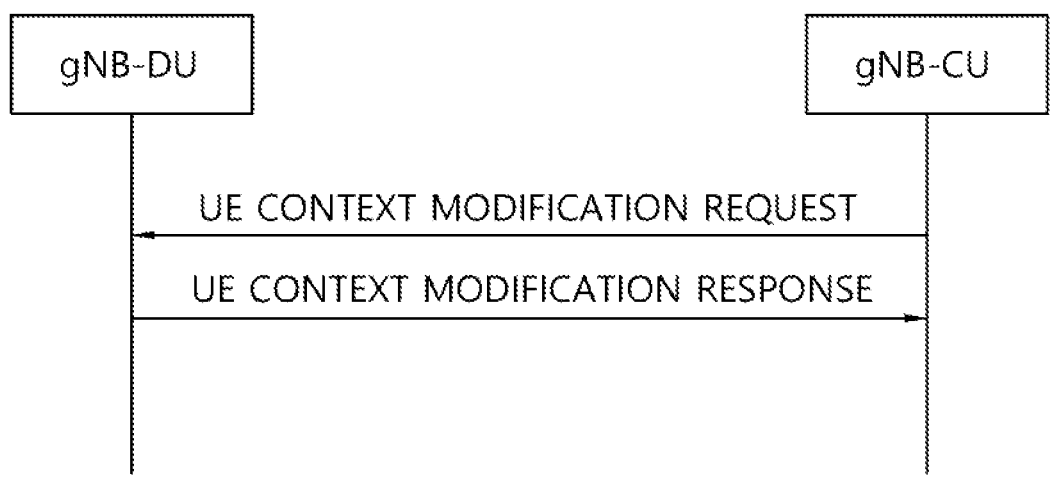
FIG. 11 shows an example of a UE context modification procedure to which technical features of the present disclosure can be applied.

FIG. 11 shows an example of a UE context modification procedure to which technical features of the present disclosure can be applied.

The purpose of the UE Context Modification procedure may be to modify the established UE Context (e.g., establishing, modifying and releasing radio resources). This procedure may also be used to command the gNB-DU to stop data transmission for the UE for mobility. The procedure may use UE-associated signalling.

Upon reception of the UE CONTEXT MODIFICATION REQUEST message, the gNB-DU shall perform the modifications, and if the modification is successful, the gNB-DU may report the update of the UE context in the UE CONTEXT MODIFICATION RESPONSE message.

Figure 12:
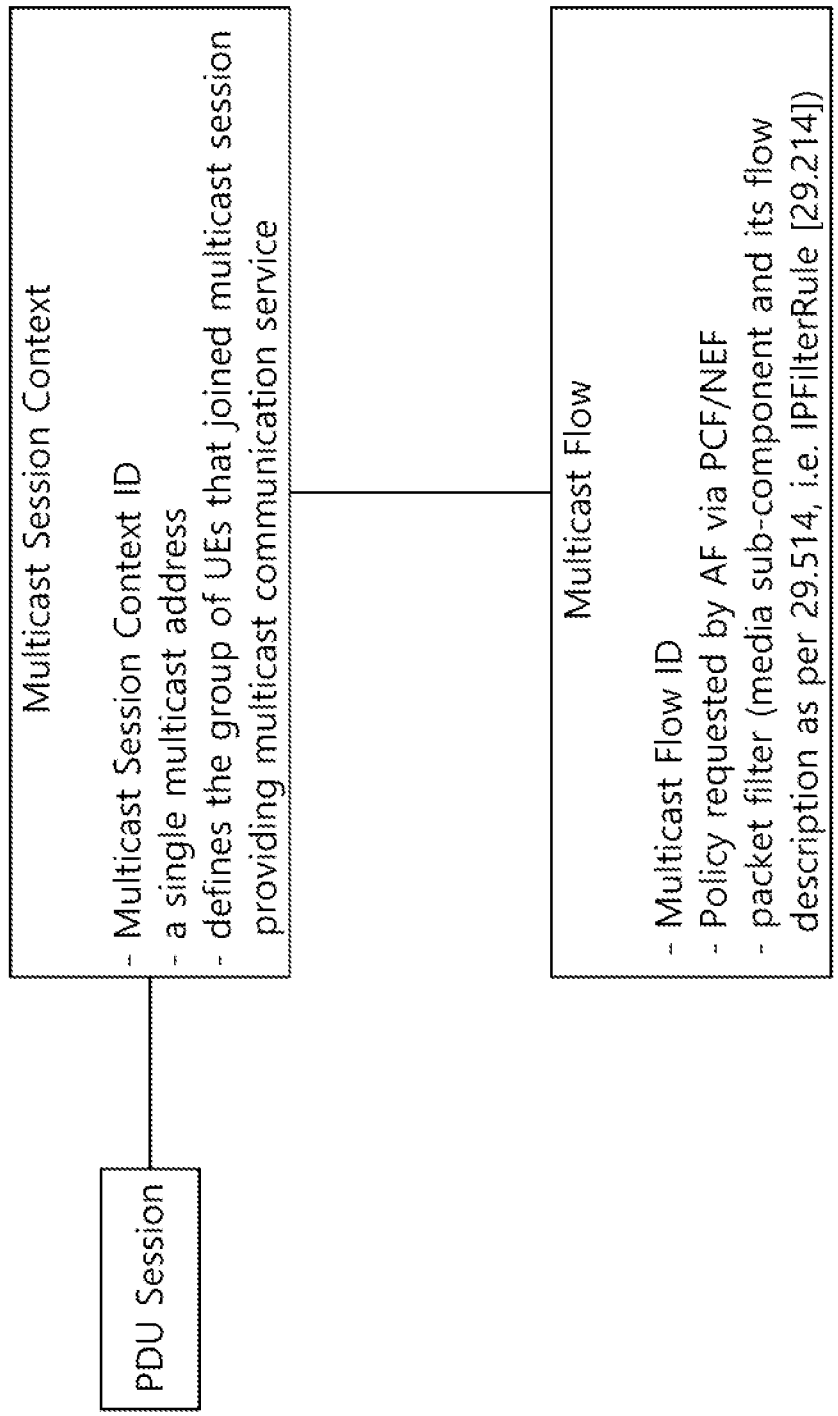
FIG. 12 shows an example of a multicast session and flow model to which technical features of the present disclosure can be applied.

FIG. 12 shows an example of a multicast session and flow model to which technical features of the present disclosure can be applied.

The Multicast Session context may be identified by a Multicast Session context ID and may be used to represent information about the group of UEs receiving Multicast flows with the same Multicast Session context ID.

In case of IP PDU session type, the Multicast session context ID may represent one IP multicast group address (i.e. any source multicast or source specific multicast). The packet filters for all Multicast flows within the Multicast context shall have the same destination and, in case of source specific multicast, also source IP addresses. The default Multicast flow shall allow for any source and destination ports and any protocols. An AF may request PCF/NEF to create policies for Multicast flows within the Multicast Session context to meet the needs of application service flows that use different ports and protocols.

On N3 or MB-N3, the Multicast flows within one Multicast Session context may use the same shared tunnel.

At the NG-RAN, the Multicast flow identifier may map to radio bearer. If the QoS characteristics of Multicast flows allow, NG-RAN can also map several Multicast flows within a Multicast Session context to one radio bearer The characteristics of the radio bearer may depend RAN decision on whether to deliver the Multicast flow content via unicast or point-to-multipoint (PTM) transmission.

The 5G QoS model may be extended to support Multicast flow. At Session Management level for a particular UE, the Multicast session context may exist in association with at least one PDU session, and can be set-up during the PDU session establishment or modification procedure. It may be modified at any point via PDU session modification procedure. The Multicast session context may be common to all UEs configured with the Multicast session context, but the associated PDU session context may be specific to each UE.

The Multicast context ID and Multicast flow ID may be assigned by the SMF. The SMF may provide the Multicast flow information (packet filters, etc) to the UPF.

If point-to-point tunneling is used in N3, the SMF may provide RAN with Multicast context ID, Multicast flows and associated QoS information. The RAN may respond with downlink tunnel information for the Multicast context. The SMF may configure UPF with Multicast flows, associated QoS information and the downlink tunnel information.

If point-to-multipoint tunneling is used (MB-N3), the SMF may provide the UPF with MB-N3 tunneling information. The SMF may provide Multicast flow Id and associated QoS information and MB-N3 tunnel information to the RAN.

Figure 13:
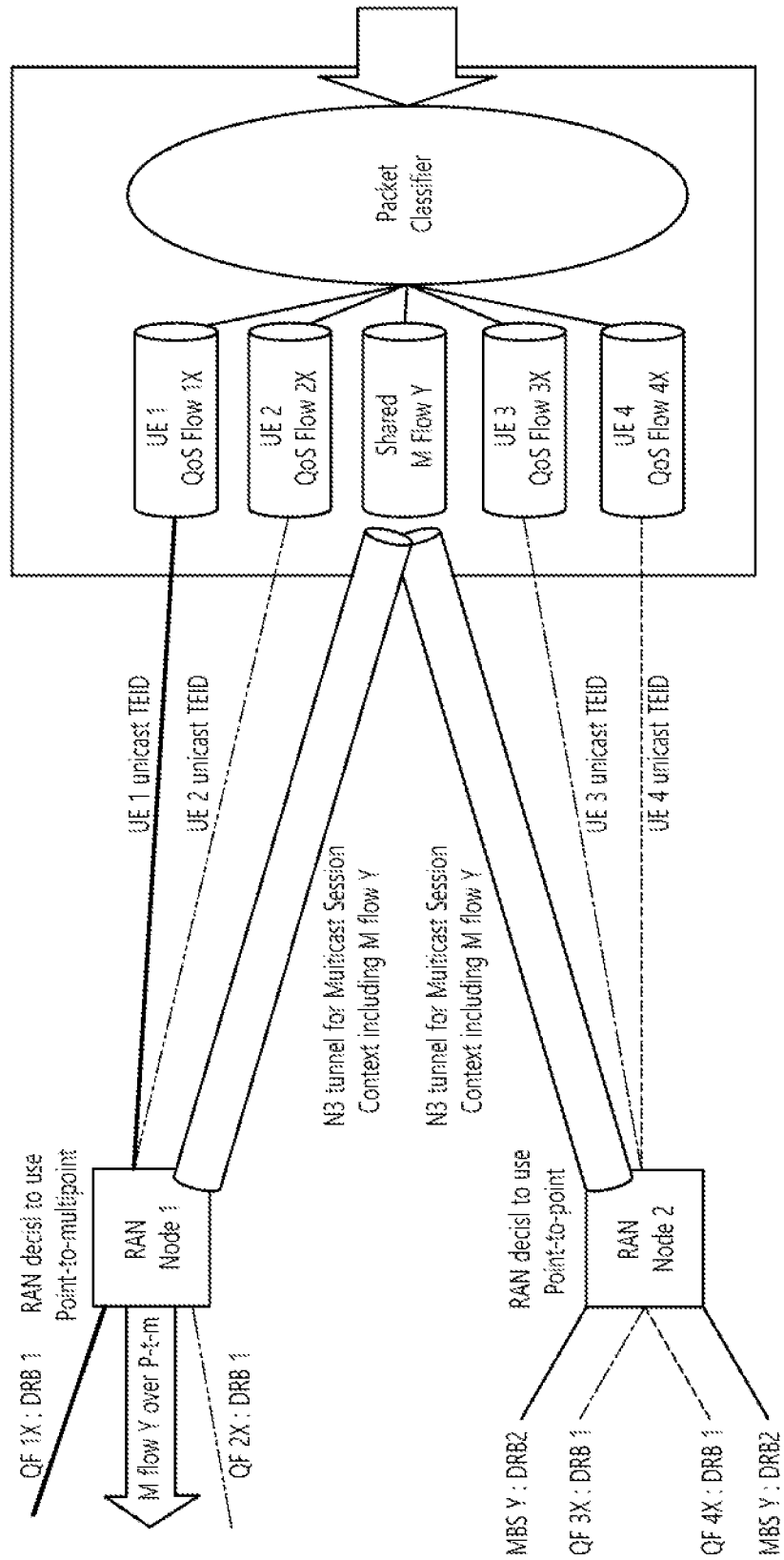
FIG. 13 shows an example of a user plane path for a multicast flow to which technical features of the present disclosure can be applied.

FIG. 13 shows an example of a user plane path for a multicast flow to which technical features of the present disclosure can be applied.

When multicast traffic is established, there may be no need for unicast transport in N3. In AS, when RAN decides to switch to PTM transmission, the DRB previously allocated to the QoS Flow may not be used anymore.

A UPF, based on configuration received from SMF, may identify a packet as belonging to a Multicast flow, in which case the UPF delivers to one or multiple RAN nodes via a shared tunnel identified by a shared TEID associated with the Multicast session context to which the Multicast flow belongs to.

AN may deliver download data for the Multicast flow via broadcast or unicast over the air. Each Multicast session context may be managed by one SMF.

Figure 14A:
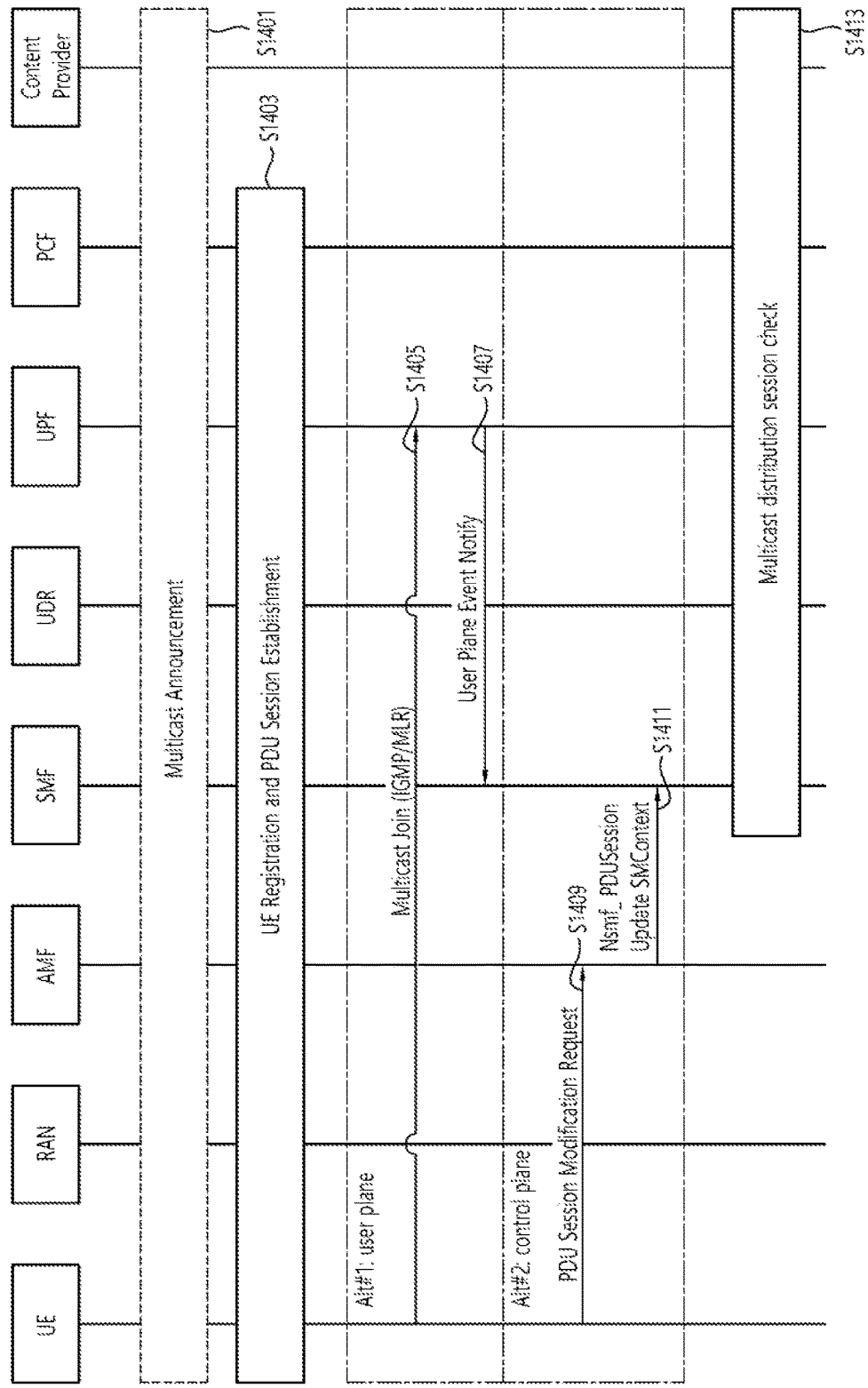
FIGS. 14A and 14B show an example of a PDU session modification procedure for multicast to which technical features of the present disclosure can be applied.
Figure 14B:
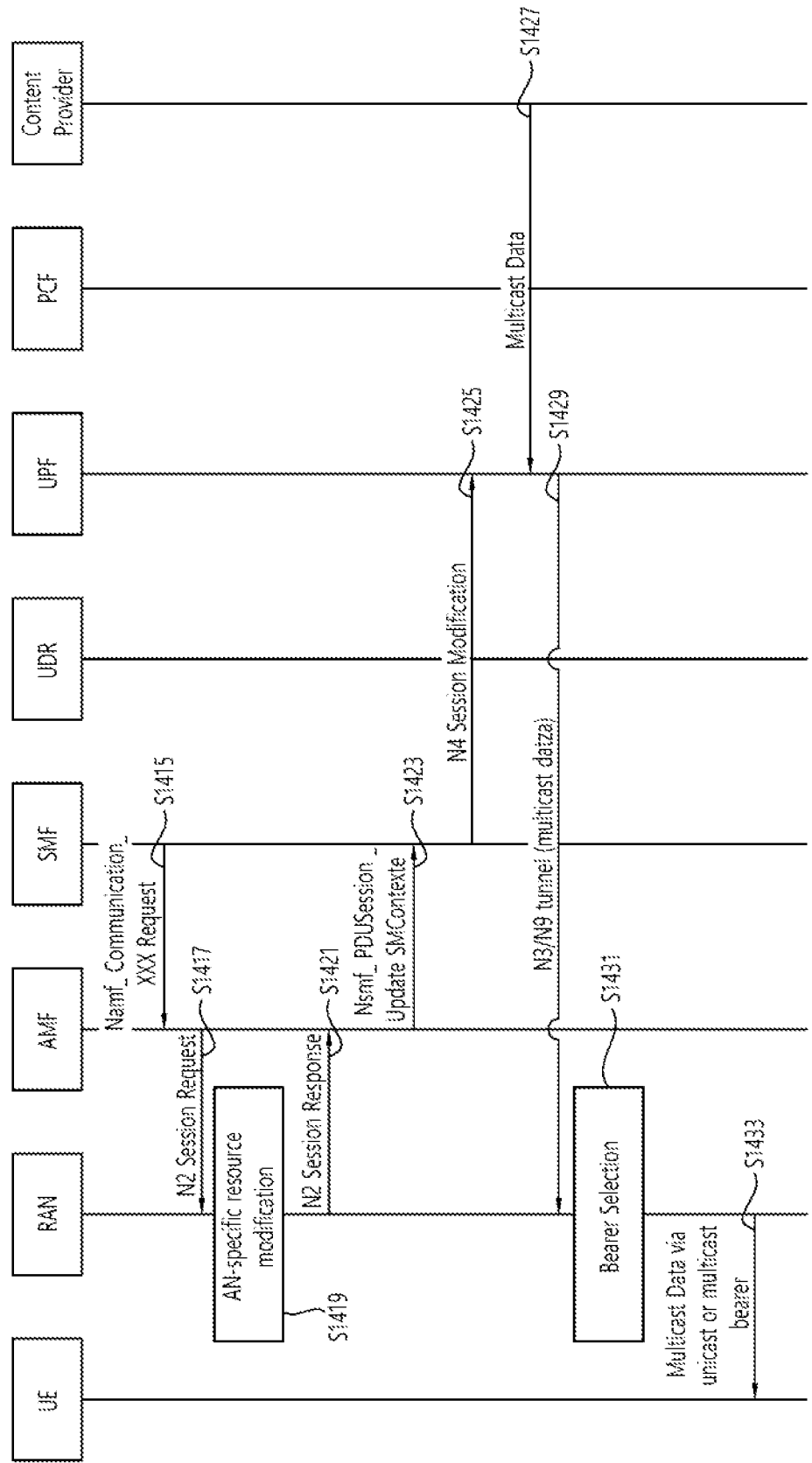

FIGS. 14A and 14B show an example of a PDU session modification procedure for multicast to which technical features of the present disclosure can be applied.

Referring to FIG. 14A, in step S1401, the content provider may announce the availability of multicast using higher layer (e.g. application layer). The announcement may include at least multicast address of multicast group that UE can join.

The content provider may also send a request to reserve resources for the corresponding multicast session to the NEF and communicate the related multicast address.

The content provider may invoke the services provided by PCF or NEF to provision the multicast information. The multicast information may be used to identify (e.g., IP Address of multicast data) and reserve resources for the multicast. Multicast information may further include: QoS requirements, UE authorization information, service area identifying the service scope, and start and/or end time of MBS.

The request to reserve resources for the corresponding multicast session may be optional and can be replaced by configured data based on commercial agreements. If IP multicast is used in the external network, the content provider may not require information where to send the multicast data.

In step S1403, the UE may register in the public land mobile network (PLMN) and request the establishment of a PDU session. The AMF may obtain information from the UDM whether the UE can join multicast sessions as part of the SMF Selection Subscription data. If so, for direct discovery, the AMF may select an SMF capable of handling multicast sessions based on locally configured data or a corresponding SMF capability stored in the NRF.

In an alternative, user plane signalling may be used. In this case, in step S1405, the UE may join the multicast group by sending a join message to the UPF, which may be a multicast capable router. In step S1407, The reception of the join message may trigger the UPF to notify the SMF. The UPF can be optimized to send the notification only when UE's status in regard to number of multicast groups UE has joined changes (i.e., when the UE joins or leaves a group). The SMF may initiate PDU session modification procedure upon the reception of the notification from the UPF.

In another alternative, control plane signalling may be used. In this case, in step S1409, the UE may send the PDU Session Establishment/Modification Request either upon a request from higher layers or upon a detection by lower layers of UE joining a multicast group (i.e., detection of IGMP or MLR and detection of the change of content of these messages). The PDU Session Modification Request shall include information about multicast group, which UE wants to join, such as multicast addresses listed in the IGMP and MLR messages. This information may be needed for configuration of UPF with appropriate packet filters. In step S1411, the AMF may invoke Nsmf_PDUSession_UpdateSMContext (SM Context ID, N1 SM container (PDU Session Modification Request with the multicast information)).

In step S1413, the SMF may check whether a multicast context for the multicast group (address) exists in the system (i.e., whether there is a UE that already joined the multicast group). If the multicast context for the multicast group does not exist, then the SMF may create the multicast context for the multicast group when the first UE joins the multicast group. If it is the first UE joining the multicast group, the UPF may also have to join the multicast tree towards the content provider.

The following steps after step S1413 will be described in FIG. 14B.

Referring to FIG. 14B, in step S1415, the SMF may request the AMF to transfer a message to the RAN node carrying transparently to RAN node an indication that the UE joined the multicast session identified by the multicast address using the Namf_Communication service.

In step S1417, the session modification request may be sent to the RAN. The request may be sent in the UE context using the currently standardized message enhanced with multicast related information, which include a multicast group identity (e.g., multicast address itself, Multicast Session context ID, or multicast flow information such as multicast QoS Flow ID and associating QoS information). The RAN may be using the multicast group identity to determine that the session modification procedures of two or more UEs correspond to one multicast group. In other words, the RAN may learn what UEs are receiving the same multicast from the multicast group identity. When the RAN receives a session modification request for previously unknown multicast group identity, the RAN may be configured to serve this multicast group.

In step S1419, the RAN may perform necessary access network resource modification such as configuration of broadcast bearers.

In step S1421, the RAN may send the session modification response that may include downlink tunnel information.

In step S1423, the AMF may transfer the possible downlink tunnel information received in step S1421 to the SMF. The SMF may store the information about the multicast distribution session towards the RAN node serving the UE and the possible received downlink tunnel information if the SMF did not previously store that information when handling a multicast service request of another UE served by the same RAN node.

In step S1425, if the RAN node serving the UE does not yet receive the multicast distribution session, the SMF handling the multicast distribution session may send an N4 session modification request to the UPF including tunnel information if unicast tunnelling is used.

In step S1427, the UPF may receive multicast PDUs according to the configuration in strep S1425.

In step S1429, the UPF may send multicast PDUs in the N3/N9 tunnel associated to the multicast distribution session to the RAN. There may be only one tunnel per multicast distribution session and RAN node (i.e., all associated PDU sessions share this tunnel).

In step S1431, the RAN may select multicast or unicast radio bearers to deliver the multicast PDUs to UEs that joined the multicast group.

In step S1433, the RAN may perform the transmission using the selected bearer.

To support multicast and broadcast services (MBS) in a communication system, dynamic control of the broadcast/multicast transmission area may be considered. The dynamic control of the broadcast/multicast transmission area may be beneficial in terms of system efficiency and user experience. Therefore, how to realize the dynamic control of the transmission area may need to be discussed.

Figure 15:
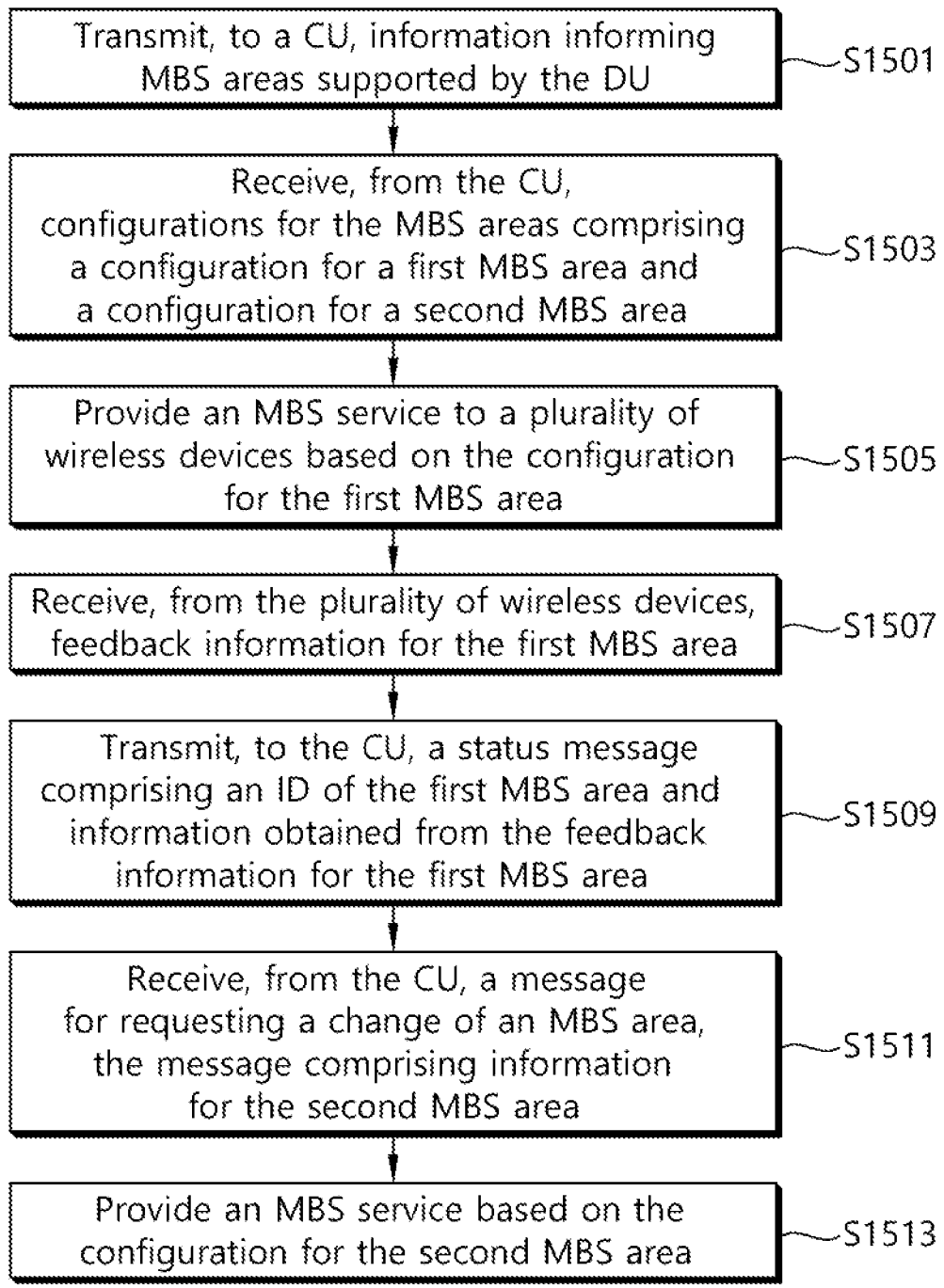
FIG. 15 shows an example of a method for dynamic control of the MBS area according to an embodiment of the present disclosure. Steps illustrated in FIG. 15 may be performed by a DU.

FIG. 15 shows an example of a method for dynamic control of the MBS area according to an embodiment of the present disclosure. Steps illustrated in FIG. 15 may be performed by a DU.

Referring to FIG. 15, in step S1501, the DU may transmit, to a CU, information informing MBS areas supported by the DU. Each MBS area may comprise one or more component areas. Each component area may comprise at least one of a cell ID, a tracking area identity (TAI) ID, a radio access network area codes (RANAC), a beam ID, or a transmission and reception point (TRP) ID.

In step S1503, the DU may receive, from the CU, configurations for one or more MBS areas comprising a configuration for a first MBS area and a configuration for a second MBS area. The one or more MBS areas may be determined among the MBs areas supported by the DU based on MBS related information. The one or more MBS areas may comprise the first MBS area and the second MBS area. The MBs related information may comprise at least one of a service identity, MBS tunnel endpoint identifier (TEID), multicast address or MBS flow identity.

In step S1505, the DU may provide an MBS service to a plurality of wireless devices based on the configuration for the first MBS area.

In step S1507, the DU may receive, from the plurality of wireless devices, feedback information for the first MBS area. The feedback information may comprise at least one of: hybrid automatic repeat request (HARQ) acknowledgement (ACK)/negative-ACK (NACK) information for a transmission of the MBS service; ACK/NACK information of radio link control (RLC) bearer for the transmission of the MBS service; or channel state information (CSI) or reformed CSI on a channel related to the MBS service.

In step S1509, the DU may transmit, to the CU, a status message comprising an ID of the first MBS area and information obtained from the feedback information for the first MBS area. For example, the DU may obtain, from the feedback information, at least one of: a number of received negative acknowledgements (NACKs) in the first MBS area; a number of failed transmissions in the first MBS area; an average NACK probability in the first MBS area; packet drop rate in the first MBS area; channel state information (CSI) or reformed CSI on a channel related to the MBS service in the first MBS area; a radio utilization efficiency for the first MBS area; or a location information of wireless devices in the first MBS area.

In step S1511, the DU may receive, from the CU, a message for requesting a change of an MBS area, the message comprising information for the second MBS area. The first MBS area may be changed to the second MBS area based on the information obtained from the feedback information for the first MBS area.

In step S1513, the DU may provide an MBS service based on the configuration for the second MBS area.

According to various embodiments, the first MBS area may be changed to the second MBS area which has a smaller number of component areas than the first MBS area based on that the number of received NACKs increases or is more than a configured threshold.

According to various embodiments, the first MBS area may be changed to the second MBS area which has a smaller number of component areas than the first MBS area based on that a channel quality in the CSI decreases or is lower than a configured threshold.

According to various embodiments, the first MBS area may be changed to the second MBS area which has a smaller number of component areas than the first MBS area based on that a radio utilization efficiency or total amount of radio resources for MBS service decreases or is lower than a configured threshold.

According to various embodiments, the first MBS area may be changed to the second MBS area which has a smaller number of component areas than the first MBS area based on that the location information of the wireless devices indicates that the MBS service can be covered by a smaller number of component areas.

According to various embodiments, the DU may transmit, to the wireless device, the configuration for the first MBS area. The DU may transmit, to the wireless device, the configuration for the second MBS area.

According to various embodiments, the one or more MBS may be determined among the MBS areas supported by the DU based on MBS related information. The one or more MBS areas may comprise the first MBS area and the second MBS area. The MBS related information may comprise at least one of a service identity, MBS tunnel endpoint identifier (TEID), multicast address or MBS flow identity.

The DU in FIG. 15 may be an example of a second device 220 in FIG. 2, and therefore, steps of the DU as illustrated in FIG. 15 may be implemented by the second device 220. For example, the processor 221 may be configured to transmit, to a central unit (CU), information informing multicast-broadcast service (MBS) areas supported by the DU. The processor 221 may be configured to receive, from the CU, configurations for one or more MBS areas comprising a configuration for a first MBS area and a configuration for a second MBS area. The processor 221 may be configured to provide an MBS service to a plurality of wireless devices based on the configuration for the first MBS area. The processor 221 may be configured to receive, from the plurality of wireless devices, feedback information for the first MBS area. The processor 221 may be configured to transmit, to the CU, a status message comprising an identity (ID) of the first MBS area and information obtained from the feedback information for the first MBS area. The processor 221 may be configured to receive, from the CU, a message for requesting a change of an MBS area, the message comprising information for the second MBS area. The processor 221 may be configured to provide an MBS service based on the configuration for the second MBS area.

Figure 16:
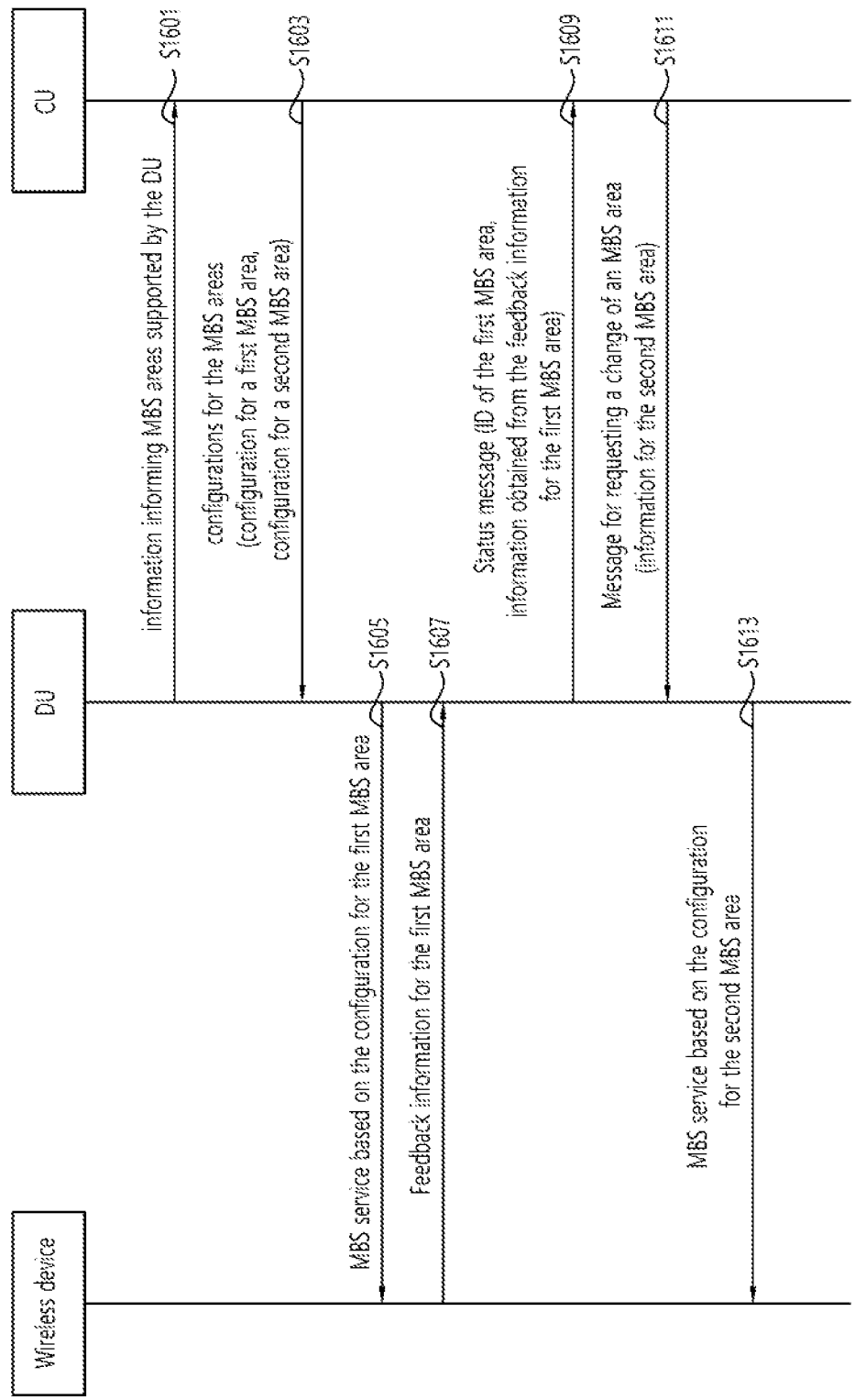
FIG. 16 shows an example of a signal flow for dynamic control of the MBS area according to an embodiment of the present disclosure.

FIG. 16 shows an example of a signal flow for dynamic control of the MBS area according to an embodiment of the present disclosure.

Referring to FIG. 16, in step S1601, the DU may transmit, to a CU, information informing MBS areas supported by the DU. Each MBS area may comprise one or more component areas. Each component area may comprise at least one of a cell ID, a tracking area identity (TAI) ID, a radio access network area codes (RANAC), a beam ID, or a transmission and reception point (TRP) ID.

In step S1603, the DU may receive, from the CU, configurations for one or more MBS areas comprising a configuration for a first MBS area and a configuration for a second MBS area. The one or more MBS areas may be determined among the MBs areas supported by the DU based on MBS related information. The one or more MBS areas may comprise the first MBS area and the second MBS area. The MBs related information may comprise at least one of a service identity, MBS tunnel endpoint identifier (TEID), multicast address or MBS flow identity.

In step S1605, the wireless device may receive an MBS service to a plurality of wireless devices based on the configuration for the first MBS area.

In step S1607, the wireless device may transmit, to the DU, feedback information for the first MBS area. The feedback information may comprise at least one of: hybrid automatic repeat request (HARQ) acknowledgement (ACK)/negative-ACK (NACK) information for a transmission of the MBS service; ACK/NACK information of radio link control (RLC) bearer for the transmission of the MBS service; or channel state information (CSI) or reformed CSI on a channel related to the MBS service.

In step S1609, the DU may transmit, to the CU, a status message comprising an ID of the first MBS area and information obtained from the feedback information for the first MBS area. For example, the DU may obtain, from the feedback information, at least one of: a number of received negative acknowledgements (NACKs) in the first MBS area; a number of failed transmissions in the first MBS area; an average NACK probability in the first MBS area; packet drop rate in the first MBS area; channel state information (CSI) or reformed CSI on a channel related to the MBS service in the first MBS area; a radio utilization efficiency for the first MBS area; or a location information of wireless devices in the first MBS area.

In step S1611, the DU may receive, from the CU, a message for requesting a change of an MBS area, the message comprising information for the second MBS area. The first MBS area may be changed to the second MBS area based on the information obtained from the feedback information for the first MBS area.

In step S1613, the wireless device may receive an MBS service based on the configuration for the second MBS area.

Figure 17:
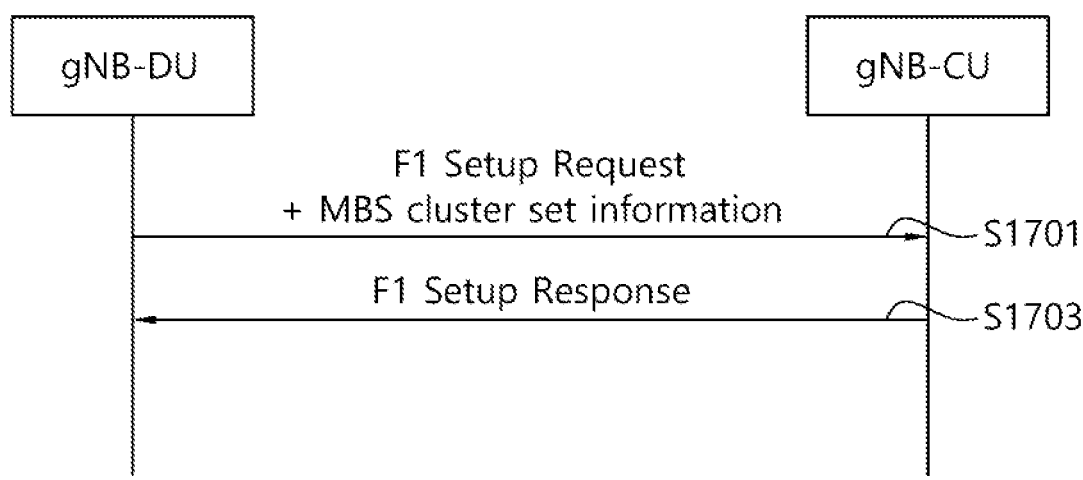
FIG. 17 shows an example of a DU-initiated initial configuration procedure on MBS transmission according to an embodiment of the present disclosure.

FIG. 17 shows an example of a DU-initiated initial configuration procedure on MBS transmission according to an embodiment of the present disclosure. The initial configuration procedure may be a cell specific procedure between a CU and the DU for setting up an application level configuration data needed to interoperate correctly over F1 interface on the MBS transmission area.

Referring to FIG. 17, in step S1701, the DU may configure MBS transmission area information (e.g., MBS cluster set) and send F1 Setup request message to the CU. The F1 setup request message may comprise MBS cluster set information, which may comprise at least one of cell IDs, TAI IDs, RANACs, beam IDs or TRPs/TRP IDs. That is, the MBS cluster set information may comprise configurations for a plurality of MBS areas and a configuration for an MBS area may comprise at least one of cell IDs, TAI IDs, RANACs, beam IDs or TRP/TRP IDs defining the MBS area (i.e., the MBS area may be defined by at least one of cell IDs, TAI IDs, RANACs, beam IDs or TRPs/TRP IDs).

In step S1703, on receiving the MBS cluster set information, the CU may apply the MBS cluster set information and store the MBS cluster set information to be used in the future session setup/change for multicast/broadcast service. The CU may transmit an F1 setup response message to the DU. The F1 setup response message may comprise indication on whether a dynamic MBS cluster set is applicable or not. That is, the indication may indicate whether a dynamic control of the MBS cluster set is applicable or not.

The CU and the DU can take a proper action based on the MBS cluster set information during a dynamic session setup/change procedure.

Figure 18:
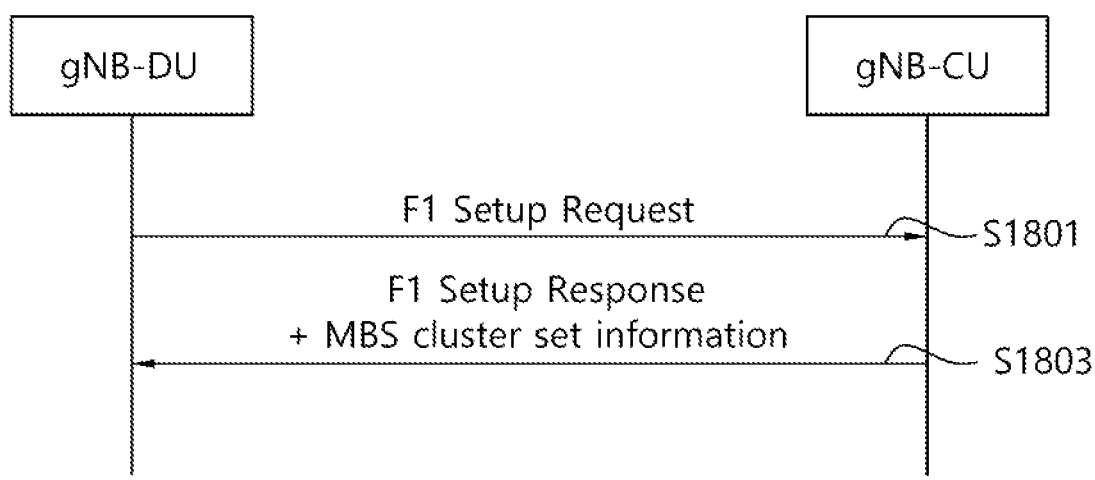
FIG. 18 shows an example of a CU-initiated initial configuration procedure on MBS transmission according to an embodiment of the present disclosure.

FIG. 18 shows an example of a CU-initiated initial configuration procedure on MBS transmission according to an embodiment of the present disclosure. The initial configuration procedure may be a cell specific procedure between the CU and the DU for setting up an application level configuration data needed to interoperate correctly over the F1 interface on the MBS transmission area.

Referring to FIG. 18, in step S1801, the DU may send an F1 setup request message to the CU. The F1 setup request message may comprise indication on support of dynamic cluster set, which may comprise at least one of cell IDs, TAI IDs, RANACs, beam IDs, or TRP/TRP IDs. That is, the F1 setup request message may comprise information informing MBS areas supported by the DU. The information informing an MBS area may comprise at least one of cell IDs, TAI IDs, RANACs, beam IDs or TRPs/TRP IDs defining the MBS area (i.e., the MBS area may be defined by at least one of cell IDs, TAI IDs, RANACs, beam IDs or TRPs/TRP IDs).

In step S1803, the CU may configure the MBS transmission area information (e.g., MBS cluster set) and send an F1 setup response message to the DU. The F1 setup response message may comprise MBS cluster set information, which may comprise at least one of cell IDs, TAI IDs, RANACs, beam IDs or TRPs/TRP IDs. That is, the MBS cluster set information may comprise configurations for a plurality of MBS areas and a configuration for an MBS area may comprise at least one of cell IDs, TAI IDs, RANACs, beam IDs or TRPs/TRP IDs defining the MBS area (i.e., the MBS area may be defined by at least one of cell IDs, TAI IDs, RANACs, beam IDs or TRPs/TRP IDs).

For example, the CU may determine one or more MBS areas among the MBS areas supported by the DU. The MBS areas supported by the DU may be informed to the CU via the F1 setup request message. The CU may generate configurations for the one or more determine MBS areas.

On receiving the MBS cluster set information, the DU may apply the MBS cluster set information and store the MBS cluster set information to be used in the future session setup/change for multicast/broadcast service.

The CU and the DU can take a proper action based on the pre-configured MBS cluster set information during a dynamic session setup/change procedure.

Figure 19A:
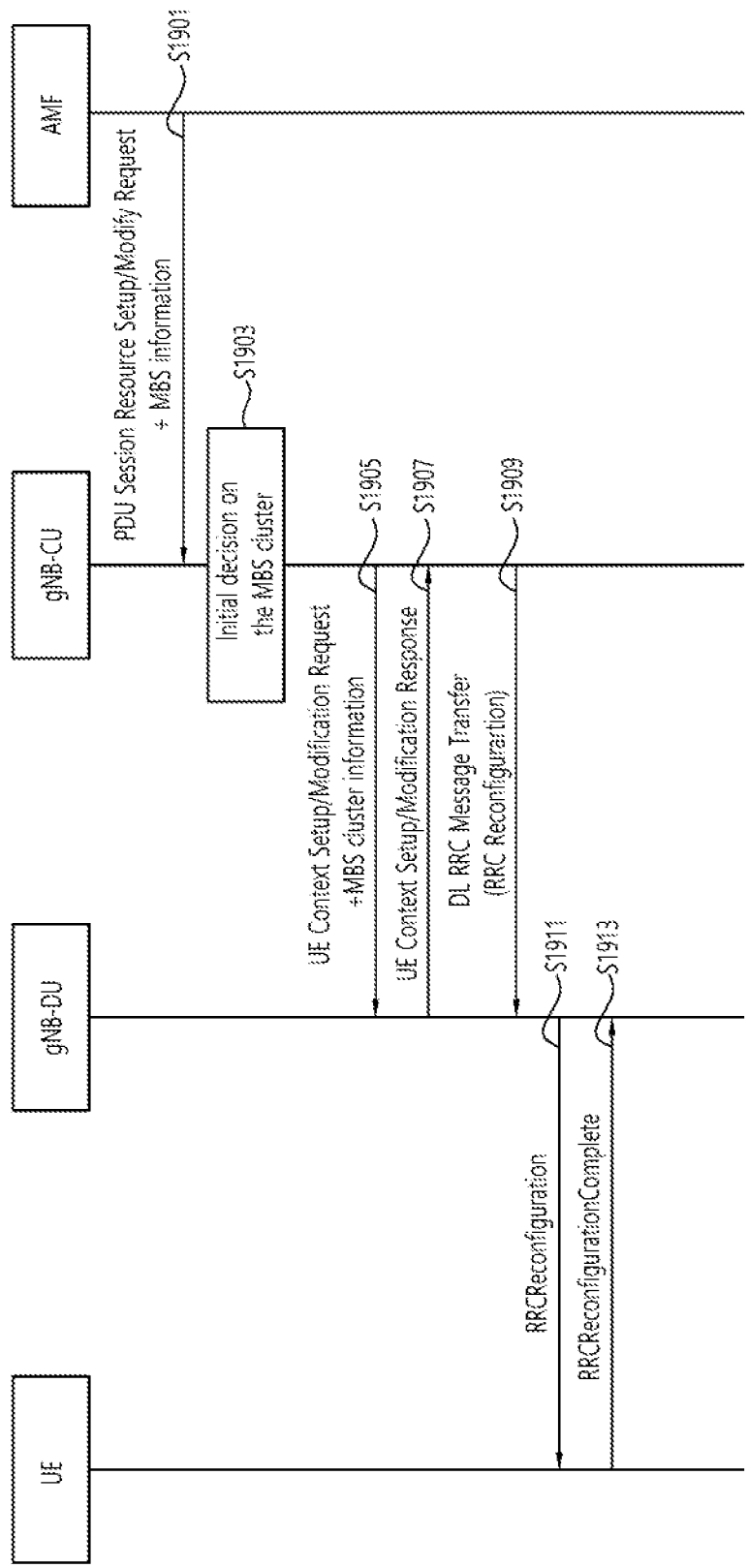
FIGS. 19A and 19B show an example of a procedure for dynamic control of multicast transmission area according to an embodiment of the present disclosure.
Figure 19B:
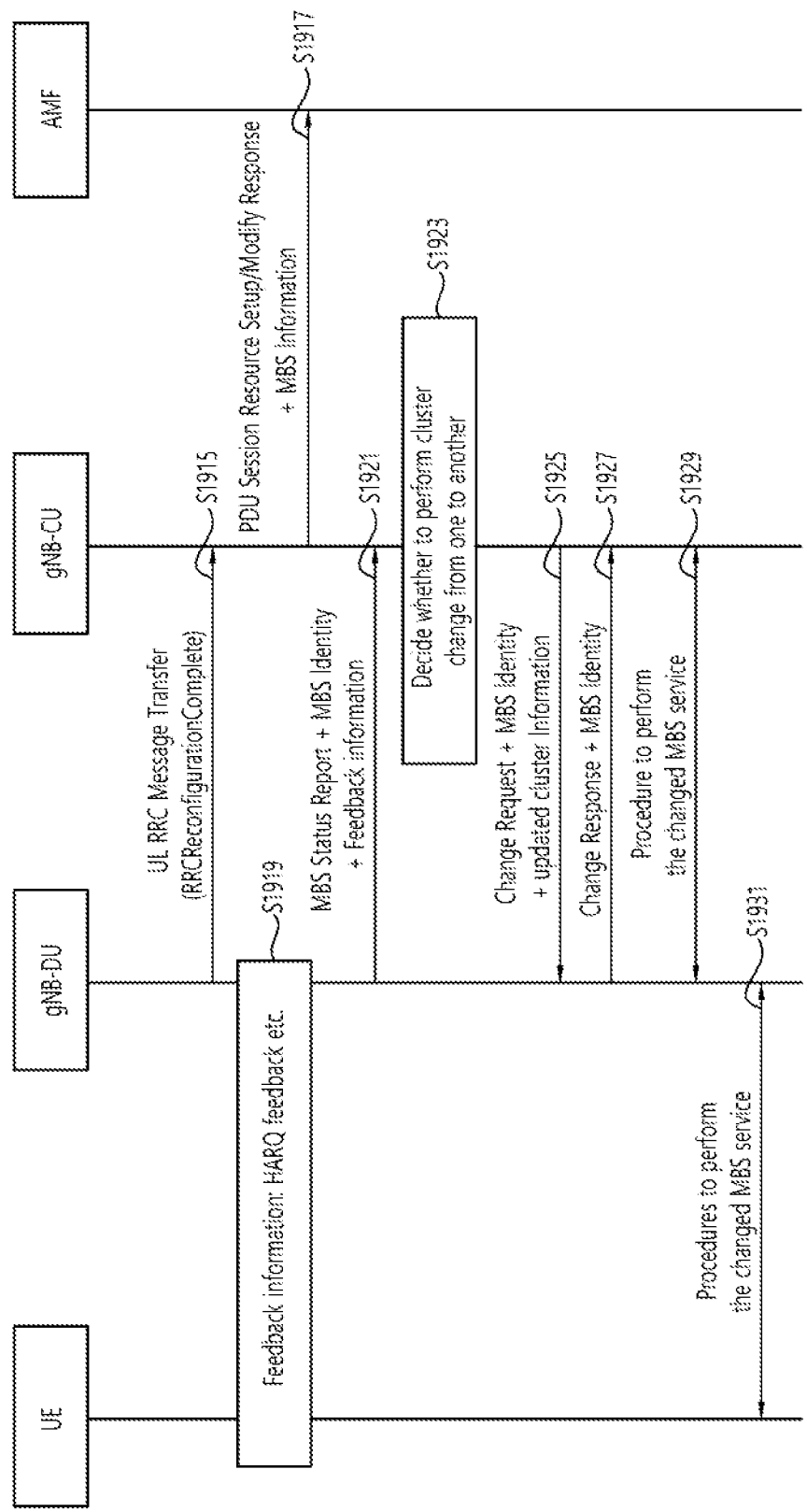

FIGS. 19A and 19B show an example of a procedure for dynamic control of multicast transmission area according to an embodiment of the present disclosure. FIGS. 19A and 19B are related to a solution that a CU coordinates cells of DUs linked to the CU and the CU/DU updates MBS service area(s) or cluster information based on feedback information for UE(s). Also, FIGS. 19A and 19B show procedures for how to dynamically change multicast transmission area (i.e., MBS area).

Referring to FIG. 19A, in step S1901, the AMF may send the PDU Session Resource Setup Request or the PDU Session Resource Modify Request message to the gNB-CU in order to establish the PDU session or setup QoS flow for multicast/broadcast data transmission. This message may include the MBS related information, for example, service identity, MBS tunnel endpoint identifier (TEID), multicast address, and/or MBS flow identity, to indicate the MBS provided through the PDU session or QoS flow to be established.

In step S1903, on receiving the setup or modify request message, the gNB-CU may store the received MBS related information and, determine the initial multicast transmission area (e.g., MBS area) based on the received MBS related information. The initial multicast transmission area may comprise at least one of:

Index of the MBS cluster set information, which may comprise at least one of cell IDs, TAI IDs, RANACs, beam IDs, or TRPs/TRP IDs. That is, the MBS cluster set information may comprise configurations for a plurality of MBS areas and a configuration for an MBS area may comprise at least one of cell IDs, TAI IDs, RANACs, beam IDs or TRPs/TRP IDs defining the MBS area (i.e., the MBS area may be defined by at least one of cell IDs, TAI IDs, RANACs, beam IDs or TRPs/TRP IDs); or MBS service area information, which may comprise at least one of cell IDs, TAI IDs, RANACs, Beam IDs or TRPs/TRP IDs. That is, the MBS service area information may comprise information for a plurality of MBS areas, and the information for an MBS area may comprise at least one of cell IDs, TAI IDs, RANACs, beam IDs or TRPs/TRP IDs defining the MBS area (i.e., the MBS area may be defined by at least one of cell IDs, TAI IDs, RANACs, beam IDs or TRPs/TRP IDs).

For example, the gNB-CU may receive, from the gNB-DU, information informing MBS areas supported by the gNB-DU. The information informing MBS areas supported by the gNB-DU may be received via F1 setup request message. Then, the gNB-CU may determine one or more MBS areas among the MBS areas supported by the gNB-DU based on the received MBS related information. The one or more MBS area may be candidate MBS area(s) in which MBS service is provided to the UE, and/or candidate MBS area(s) to be dynamically controlled. The gNB-CU may generate configurations for the one or more determined MBS areas. A configuration for a determined MBS area may comprise at least one of cell IDs, TAI IDs, RANACs, beam IDs or TRPs/TRP IDs defining the determined MBS area (i.e., the determined MBS area may be defined by at least one of cell IDs, TAI IDs, RANACs, beam IDs or TRPs/TRP IDs). The one or more MBS areas may comprise a first MBS area and a second MBS area.

In step S1905, the gNB-CU may transmit a UE Context Setup Request message or a UE Context Modification Request message to the gNB-DU or other MBS dedicated message in order to request the setup of bearer for multicast/broadcast data transmission. This message may contain the MBS Identity (e.g., service identity and/or MBS flow identity), to indicate an MBS related to the requested bearer. This message may also include information for one or more multicast transmission areas (i.e., MBS areas). The information for one or more MBS areas may comprise at least one of:

- Index of the determined MBS cluster set information, which may comprise at least one of cell IDs, TAI IDs, RANACs, beam IDs, or TRPs/TRP IDs. The determined MBS cluster set information may comprise configurations for the determined MBS areas, and a configuration for a determined MBS area may comprise at least one of cell IDs, TAI IDs, RANACs, beam IDs or TRPs/TRP IDs defining the determined MBS area (i.e., the determined MBS area may be defined by at least one of at least one of cell IDs, TAI IDs, RANACs, beam IDs or TRPs/TRP IDs defining the determined MBS area). The configurations for the determined MBS areas may comprise a configuration for a first MBS area and a configuration for a second MBS area; or
- MBS service area information, which may comprise at least one of cell IDs, TAI IDs, RANACs, Beam IDs or TRPs/TRP IDs. That is, the MBS service area information may comprise information for a plurality of MBS areas, and the information for an MBS area may comprise at least one of cell IDs, TAI IDs, RANACs, beam IDs or TRPs/TRP IDs defining the MBS area (i.e., the MBS area may be defined by at least one of cell IDs, TAI IDs, RANACs, beam IDs or TRPs/TRP IDs).

In step S1907, when receiving the setup or modification request message, the gNB-DU can identify the MBS to be provided to the UE through the requested bearer. Also, the gNB-DU may know the number of UEs provided with the MBS or interested in the MBS. Including the configuration for requested bearer, the gNB-DU may respond with the UE Context Setup Response or the UE Context Modification Response message or other MBS dedicated message to the gNB-CU.

In step S1909, the gNB-CU may send the DL RRC Message Transfer message or other MBS dedicated message containing the RRCReconfiguration with the configuration of bearer for multicast/broadcast data transmission to the gNB-DU.

In step S1911, upon the receipt of the message from the gNB-CU, the gNB-DU may forward the RRCReconfiguration to the UE. Further, the gNB-DU may transmit, to the UE, one or more configurations for one or more MBS areas determined in step S1903. The one or more configurations for the one or more MBS areas may be transmitted to the UE via the RRCReconfiguration message, or via separate message. The one or more configurations for the one or more MBS areas may comprise a configuration for a first MBS area. The gNB-DU may provide an MBS service to a plurality of UEs including the UE based on the configuration for the first MBS area.

In step S1913, the UE may transmit the RRCReconfigurationComplete to the gNB-DU.

The following steps after step S1913 will be described in FIG. 19B.

Referring to FIG. 19B, in step S1915, on receiving the message from the UE, the gNB-DU may send the UL RRC Message Transfer message or other MBS dedicated message to the gNB-CU to forward the RRCReconfigurationComplete received from the UE.

In step S1917, when receiving the message from the gNB-DU, the gNB-CU may transmit to the AMF the PDU Session Resource Setup Response or the PDU Session Resource Modify Response message. This message may include the MBS related information such as service identity, MBS TEID (downlink), and/or MBS flow identity, to indicate the MBS which the AMF requests.

The following steps may be associated with how to realize the update of MBS transmission area and scheduling information, which is triggered from the gNB-CU.

In step S1919, for the MBs, the UEs may send to the gNB-DU layer 1/2 based feedback information. The feedback information may be related to the one or more determined MBS areas (e.g., first MBS area), and comprise at least one of:

- hybrid automatic repeat request (HARQ) acknowledge (ACK)/negative ACK (NACK) information for downlink multicast/broadcast data transmission;
- ACK/NACK information of RLC of bearer for downlink multicast/broadcast data transmission; or
- Channel state information (CSI) or reformed CSI information related feedback.

In step S1921, based on the feedback information from UEs on the MBS, the gNB-DU may evaluate the following performance per MBS area or per MBS service or per cluster or per MBS channel or per beam or per TRP:

1) HARQ feedback (error rate related)
   The number of received NACKs. (DU may increase this number by one whenever NACK to initial transmission or retransmission is received).
   The number of failed transmissions (DU may increase this number by one whenever retransmission is done up to the maximum number of retransmissions but ACK to retransmission is not received).

For example, the average NACK probability observed in a certain time window can be reported.

For example, if HARQ-ACK feedback is UE-specific in the air interface, DU can merge them into the cell-specific ACK/NACK or per MBS area specific or per TAI, or per Beam ID, or per TRP, or per cluster or per MBS channel.

2) packet drop rate measured within a period (the period can be one of MBS scheduling period, and a period configured by OAM or CU)
   The number of dropped SDUs or PDUs in L2 entity (e.g., PDCP, RLC or MAC) over the total number of SDUs or PDUs received from CU-UP within a period.
   The amount of dropped SDUs or PDUs in L2 entity over the total amount of SDUs or PDUs received from CU-UP within a period.

3) CSI or reformed CSI information related feedback

4) Radio Utilization Efficiency per MBS area or per MBS service or per cluster or per MBS channel or per beam or per TRP, for example, the (expected) total amount of radio resources (to be) used for multicast/broadcast 5) UEs' location information, geo based or other positioning information And the gNB-DU may decide whether to transmit feedback information to the gNB-CU. If so, the gNB-DU may transmit the MBS Status Indication, existing, or new message to the gNB-CU. The MBS status indication message (or, simply status message) may comprise ID of the one or more determined MBS areas (e.g., first MBS area), and/or information obtained from the feedback information for the one or more determined MBS areas. The information obtained from the feedback information for the one or more determined MBS areas may comprise at least one of:

1) HARQ feedback (error rate related)

The number of received NACKs. (DU may increase this number by one whenever NACK to initial transmission or retransmission is received).

The number of failed transmissions (DU may increase this number by one whenever retransmission is done up to the maximum number of retransmissions but ACK to retransmission is not received).

For example, the average NACK probability observed in a certain time window can be reported.

For example, if HARQ-ACK feedback is UE-specific in the air interface, DU can merge them into the cell-specific ACK/NACK or per MBS area specific or per TAI, or per Beam ID, or per TRP, or per cluster or per MBS channel.

2) packet drop rate measured within a period (the period can be one of MBS scheduling period, and a period configured by OAM or CU)

The number of dropped SDUs or PDUs in L2 entity (e.g., PDCP, RLC or MAC) over the total number of SDUs or PDUs received from CU-UP within a period.

The amount of dropped SDUs or PDUs in L2 entity over the total amount of SDUs or PDUs received from CU-UP within a period.

3) CSI or reformed CSI information related feedback

4) Radio Utilization Efficiency per MBS area or per MBS service or per cluster or per MBS channel or per beam or per TRP, for example, the (expected) total amount of radio resources (to be) used for multicast/broadcast 5) UEs' location information, geometric based or other positioning information In step S1923, upon receipt of the information above from the gNB-DU, the gNB-CU may determine whether to perform the cluster change/MBS service area change or not based on the received information. The MBS cluster information or MBS service area information may comprise at least one of cell IDs, TAI IDs, RANACs, beam IDs, or TRPs/TRP IDs. For example, the gNB-CU may determine to change an MBS area from the first MBS area to a second MBS area based on the received information.

For example, the gNB-CU may change the first MBS area to the second MBS area which has a smaller number of component areas than the first MBS area. The gNB-CU may exclude some bad component areas (i.e., cells/TAs/RAN areas/beams/TRPs) which may not be suitable for a MBS service and therefore can be replaced by a unicast service from the first MBS area to obtain the second MBS area. Therefore, the service quality of good cells/TAs/RAN areas/beams/TRPs will not be impacted. The gNB-CU may change the first MBS area to the second MBS area which has a smaller number of component areas than the first MBS area if:

- the number of received NACKs increases or is more than a configured threshold;
- the number of failed transmissions increases or is more than a configured threshold;
- the average NACK probability observed in a certain time window increases or is more than a configured threshold;
- packet drop rate measured within a period increases or is more than a configured threshold;
- The number of dropped SDUs or PDUs in L2 entity over the total number of SDUs or PDUs received from CU-UP within a period increases or is more than a configured threshold;
- The amount of dropped SDUs or PDUs in L2 entity over the total amount of SDUs or PDUs received from CU-UP within a period increases or is more than a configured threshold;
- channel quality in the CSI decreases or is lower than a configured threshold;
- Radio Utilization Efficiency or total amount of radio resources (to be) used for MBS service decreases or is lower than a configured threshold; or
- UEs' location information indicates that UEs provided with the MBS service can be covered by a smaller number of cells/TAs/RAN areas/beams/TRPs.

For another example, the gNB-CU may change the first MBS area to the second MBS area which has a larger number of cell IDs/TAI IDs/RANACs/beam IDs/TRP IDs than the first MBS area. The gNB-CU may add some good cells/TAs/RAN areas/beams/TRPs which may be suitable for a MBS service to the first MBS area to obtain the second MBS area. The gNB-CU may change the first MBS area to the second MBS area which has a smaller number of cell IDs/TAI IDs/RANACs/beam IDs/TRP IDs than the first MBS area if:

- the number of received NACKs decreases or is less than a configured threshold;
- the number of failed transmissions decreases or is less than a configured threshold;
- the average NACK probability observed in a certain time window decreases or is less than a configured threshold;
- packet drop rate measured within a period decreases or is less than a configured threshold;
- The number of dropped SDUs or PDUs in L2 entity over the total number of SDUs or PDUs received from CU-UP within a period decreases or is less than a configured threshold;
- The amount of dropped SDUs or PDUs in L2 entity over the total amount of SDUs or PDUs received from CU-UP within a period decreases or is less than a configured threshold;
- channel quality in the CSI increases or is more than a configured threshold;
- Radio Utilization Efficiency or total amount of radio resources (to be) used for MBS service increases or is more than a configured threshold; or
- UEs' location information indicates that UEs provided with the MBS service can be covered by a larger number of cells/TAs/RAN areas/beams/TRPs.

In step S1925, the gNB-CU may send the Change Request message, existing, or new message to the gNB-DU. The change request message may include at least one of:

- The MBS Identity to indicate the MBS to be switched (e.g., identity of the second MBS area);
- Index of the decided MBS cluster information (i.e., second MBS area), which may comprise at least one of cell IDs, TAI IDs, RANAC (RAN Area Code), Beam IDs, or TRPs/TRP IDs; or
- the updated MBS service area information (i.e., second MBS area), which may comprise at least one of cell IDs, TAI IDs, RANAC (RAN Area Code), Beam IDs, or TRPs/TRP IDs.

In step S1927, on receiving the message from the gNB-CU, the gNB-DU may check whether to be able to allocate the radio resource for multicast for indicated MBS cluster or service area (i.e., second MBS area). If available, the gNB-DU may respond with the Change Response message, existing, or new message to the gNB-CU. This message may include the MBS Channel Information and the MBS Identity (i.e., identity of the second MBS area) to provide multicast channel information to the UE(s) provided with the indicated MBS.

In steps S1929 and S1931, the gNB-CU may trigger the corresponding procedures for the changed MBS service to DU and DU may correspondingly trigger the procedures to UEs. The gNB-DU may transmit a configuration for the second MBS area to the UEs, and provide an MBS service based on the configuration for the second MBS area.

Figure 20:
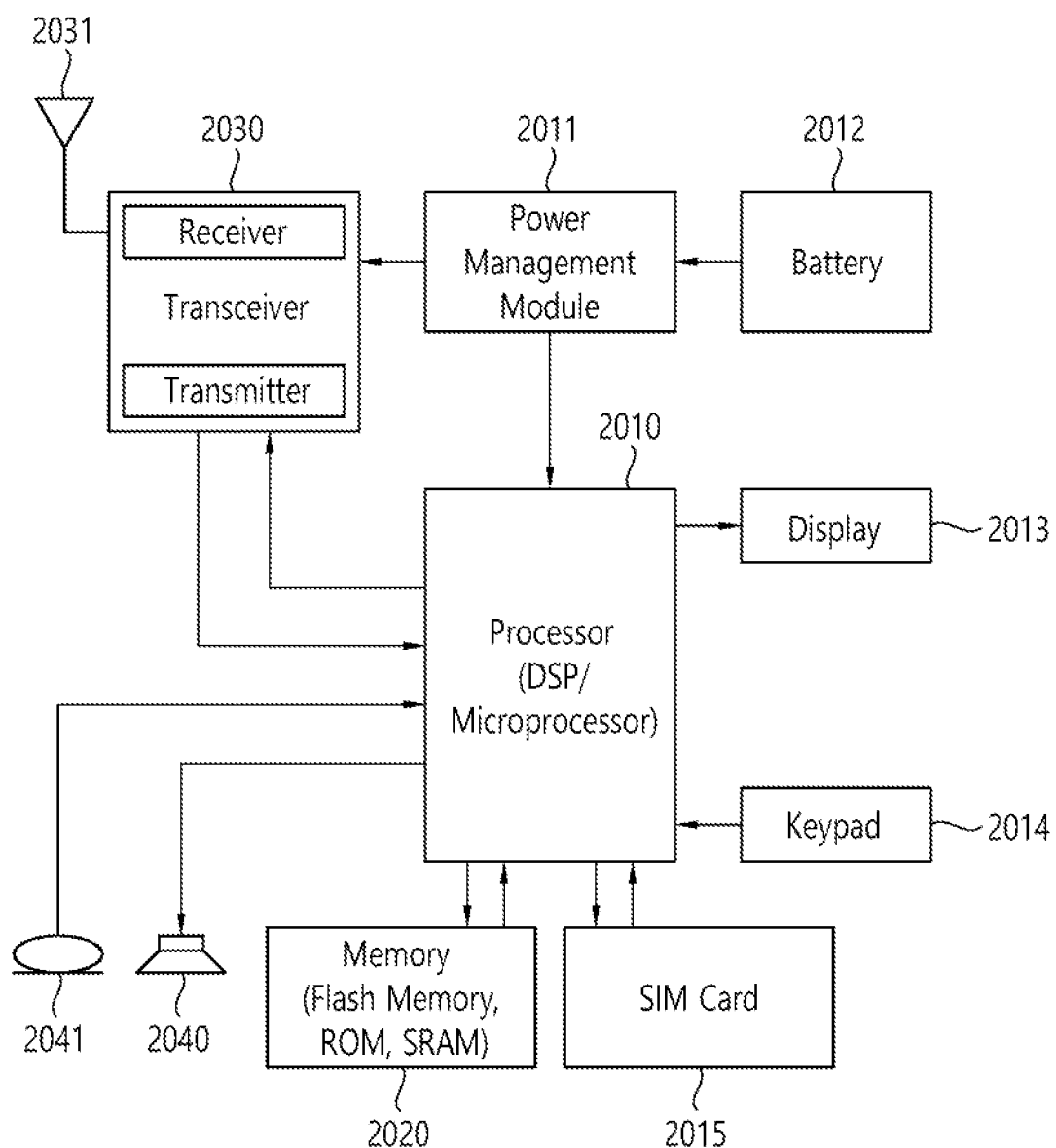
FIG. 20 shows a UE to implement an embodiment of the present disclosure.

FIG. 20 shows a UE to implement an embodiment of the present disclosure. The present disclosure described above for UE side may be applied to this embodiment. The UE in FIG. 20 may be an example of first device 220 as illustrated in FIG. 2.

A UE includes a processor 2010 (i.e., processor 211), a power management module 2011, a battery 2012, a display 2013, a keypad 2014, a subscriber identification module (SIM) card 2015, a memory 2020 (i.e., memory 212), a transceiver 2030 (i.e., transceiver 213), one or more antennas 2031, a speaker 2040, and a microphone 2041.

The processor 2010 may be configured to implement proposed functions, procedures and/or methods described in this description. Layers of the radio interface protocol may be implemented in the processor 2010. The processor 2010 may include application-specific integrated circuit (ASIC), other chipset, logic circuit and/or data processing device. The processor 2010 may be an application processor (AP). The processor 2010 may include at least one of a digital signal processor (DSP), a central processing unit (CPU), a graphics processing unit (GPU), a modem (modulator and demodulator). An example of the processor 2010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 2010 may be configured to, or configured to control the transceiver 2030 to implement steps performed by the UE and/or the wireless device throughout the disclosure.

The power management module 2011 manages power for the processor 2010 and/or the transceiver 2030. The battery 2012 supplies power to the power management module 2011. The display 2013 outputs results processed by the processor 2010. The keypad 2014 receives inputs to be used by the processor 2010. The keypad 2014 may be shown on the display 2013. The SIM card 2015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 2020 is operatively coupled with the processor 2010 and stores a variety of information to operate the processor 2010. The memory 2020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 2020 and executed by the processor 2010. The memory 2020 can be implemented within the processor 2010 or external to the processor 2010 in which case those can be communicatively coupled to the processor 2010 via various means as is known in the art.

The transceiver 2030 is operatively coupled with the processor 2010, and transmits and/or receives a radio signal. The transceiver 2030 includes a transmitter and a receiver. The transceiver 2030 may include baseband circuitry to process radio frequency signals. The transceiver 2030 controls the one or more antennas 2031 to transmit and/or receive a radio signal.

The speaker 2040 outputs sound-related results processed by the processor 2010. The microphone 2041 receives sound-related inputs to be used by the processor 2010.

According to various embodiments, the processor 2010 may be configured to, or configured to control the transceiver 2030 to implement steps performed by the UE and/or the wireless device throughout the disclosure. For example, the processor 2010 may configured to control the transceiver 2020 to receive, from a DU, a transmission of a multicast-broadcast service (MBS) service based on a configuration for a first MBS area. The processor 2010 may configured to control the transceiver 2020 to transmit, to the DU, feedback information for the first MBS area. The processor 2010 may configured to control the transceiver 2020 to receive, from the DU, a transmission of an MBS service based on a configuration for a second MBS area. The first MBS area may be changed to the second MBS area based on information obtained from the feedback information for the first MBS area.

Figure 21:
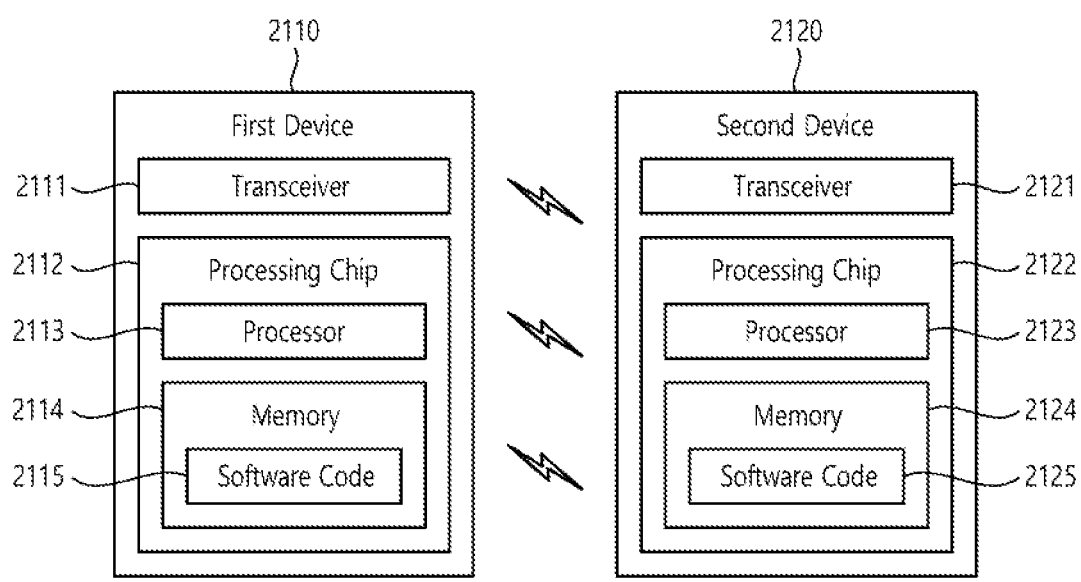
FIG. 21 shows another example of a wireless communication system to which the technical features of the present disclosure can be applied.

FIG. 21 shows another example of a wireless communication system to which the technical features of the present disclosure can be applied.

Referring to FIG. 21, the wireless communication system may include a first device 2110 (i.e., first device 210) and a second device 2120 (i.e., second device 220).

The first device 2110 may include at least one transceiver, such as a transceiver 2111, and at least one processing chip, such as a processing chip 2112. The processing chip 2112 may include at least one processor, such a processor 2113, and at least one memory, such as a memory 2114. The memory may be operably connectable to the processor 2113. The memory 2114 may store various types of information and/or instructions. The memory 2114 may store a software code 2115 which implements instructions that, when executed by the processor 2113, perform operations of the first device 910 described throughout the disclosure. For example, the software code 2115 may implement instructions that, when executed by the processor 2113, perform the functions, procedures, and/or methods of the first device 2110 described throughout the disclosure. For example, the software code 2115 may control the processor 2113 to perform one or more protocols. For example, the software code 2115 may control the processor 2113 to perform one or more layers of the radio interface protocol.

The second device 2120 may include at least one transceiver, such as a transceiver 2121, and at least one processing chip, such as a processing chip 2122. The processing chip 2122 may include at least one processor, such a processor 2123, and at least one memory, such as a memory 2124. The memory may be operably connectable to the processor 2123. The memory 2124 may store various types of information and/or instructions. The memory 2124 may store a software code 2125 which implements instructions that, when executed by the processor 2123, perform operations of the second device 2120 described throughout the disclosure. For example, the software code 2125 may implement instructions that, when executed by the processor 2123, perform the functions, procedures, and/or methods of the second device 2120 described throughout the disclosure. For example, the software code 2125 may control the processor 2123 to perform one or more protocols. For example, the software code 2125 may control the processor 2123 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 22:
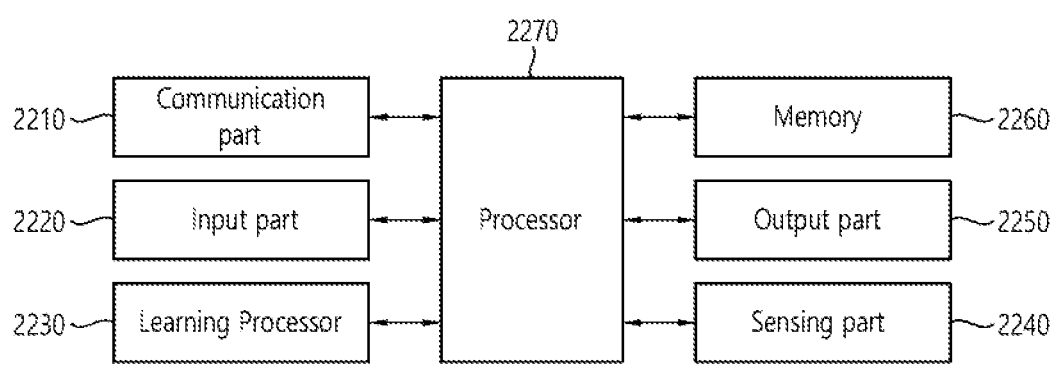
FIG. 22 shows an example of an AI device to which the technical features of the present disclosure can be applied.

FIG. 22 shows an example of an AI device to which the technical features of the present disclosure can be applied.

The AI device 2200 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 22, the AI device 2200 may include a communication part 2210, an input part 2220, a learning processor 2230, a sensing part 2240, an output part 2250, a memory 2260, and a processor 2270.

The communication part 2210 can transmit and/or receive data to and/or from external devices such as the AI devices and the AI server using wire and/or wireless communication technology. For example, the communication part 2210 can transmit and/or receive sensor information, a user input, a learning model, and a control signal with external devices. The communication technology used by the communication part 2210 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2220 can acquire various kinds of data. The input part 2220 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 2220 can acquire input data to be used when acquiring an output using learning data and a learning model for model learning. The input part 2220 may obtain raw input data, in which case the processor 2270 or the learning processor 2230 may extract input features by preprocessing the input data.

The learning processor 2230 may learn a model composed of an ANN using learning data. The learned ANN can be referred to as a learning model. The learning model can be used to infer result values for new input data rather than learning data, and the inferred values can be used as a basis for determining which actions to perform. The learning processor 2230 may perform AI processing together with the learning processor of the AI server. The learning processor 2230 may include a memory integrated and/or implemented in the AI device 2200. Alternatively, the learning processor 2230 may be implemented using the memory 2260, an external memory directly coupled to the AI device 2200, and/or a memory maintained in an external device.

The sensing part 2240 may acquire at least one of internal information of the AI device 2200, environment information of the AI device 2200, and/or the user information using various sensors. The sensors included in the sensing part 2240 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2250 may generate an output related to visual, auditory, tactile, etc. The output part 2250 may include a display unit for outputting visual information, a speaker for outputting auditory information, and/or a haptic module for outputting tactile information.

The memory 2260 may store data that supports various functions of the AI device 2200. For example, the memory 2260 may store input data acquired by the input part 2220, learning data, a learning model, a learning history, etc.

The processor 2270 may determine at least one executable operation of the AI device 2200 based on information determined and/or generated using a data analysis algorithm and/or a machine learning algorithm. The processor 2270 may then control the components of the AI device 2200 to perform the determined operation. The processor 2270 may request, retrieve, receive, and/or utilize data in the learning processor 2230 and/or the memory 2260, and may control the components of the AI device 2200 to execute the predicted operation and/or the operation determined to be desirable among the at least one executable operation. The processor 2270 may generate a control signal for controlling the external device, and may transmit the generated control signal to the external device, when the external device needs to be linked to perform the determined operation. The processor 2270 may obtain the intention information for the user input and determine the user's requirements based on the obtained intention information. The processor 2270 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2230 and/or learned by the learning processor of the AI server, and/or learned by their distributed processing. The processor 2270 may collect history information including the operation contents of the AI device 2200 and/or the user's feedback on the operation, etc. The processor 2270 may store the collected history information in the memory 2260 and/or the learning processor 2230, and/or transmit to an external device such as the AI server. The collected history information can be used to update the learning model. The processor 2270 may control at least some of the components of AI device 2200 to drive an application program stored in memory 2260. Furthermore, the processor 2270 may operate two or more of the components included in the AI device 2200 in combination with each other for driving the application program.

Figure 23:
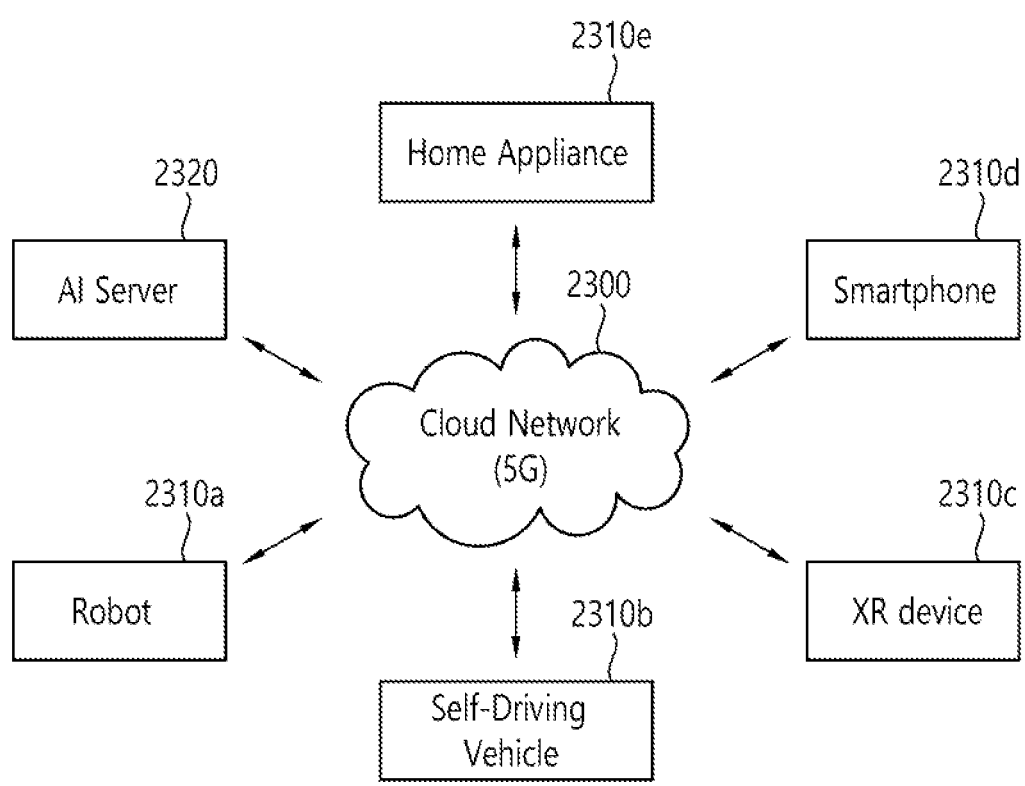
FIG. 23 shows an example of an AI system to which the technical features of the present disclosure can be applied.

FIG. 23 shows an example of an AI system to which the technical features of the present disclosure can be applied.

Referring to FIG. 23, in the AI system, at least one of an AI server 2320, a robot 2310a, an autonomous vehicle 2310b, an XR device 2310c, a smartphone 2310d and/or a home appliance 2310e is connected to a cloud network 2300. The robot 2310a, the autonomous vehicle 2310b, the XR device 2310c, the smartphone 2310d, and/or the home appliance 2310e to which the AI technology is applied may be referred to as AI devices 2310a to 2310e.

The cloud network 2300 may refer to a network that forms part of a cloud computing infrastructure and/or resides in a cloud computing infrastructure. The cloud network 2300 may be configured using a 3G network, a 4G or LTE network, and/or a 5G network. That is, each of the devices 2310a to 2310e and 2320 consisting the AI system may be connected to each other through the cloud network 2300. In particular, each of the devices 2310a to 2310e and 2320 may communicate with each other through a base station, but may directly communicate with each other without using a base station.

The AI server 2320 may include a server for performing AI processing and a server for performing operations on big data. The AI server 2320 is connected to at least one or more of AI devices constituting the AI system, i.e. the robot 2310a, the autonomous vehicle 2310b, the XR device 2310c, the smartphone 2310d and/or the home appliance 2310e through the cloud network 2300, and may assist at least some AI processing of the connected AI devices 2310a to 2310e. The AI server 2320 can learn the ANN according to the machine learning algorithm on behalf of the AI devices 2310a to 2310e, and can directly store the learning models and/or transmit them to the AI devices 2310a to 2310e. The AI server 2320 may receive the input data from the AI devices 2310a to 2310e, infer the result value with respect to the received input data using the learning model, generate a response and/or a control command based on the inferred result value, and transmit the generated data to the AI devices 2310a to 2310e. Alternatively, the AI devices 2310a to 2310e may directly infer a result value for the input data using a learning model, and generate a response and/or a control command based on the inferred result value.

Various embodiments of the AI devices 2310a to 2310e to which the technical features of the present disclosure can be applied will be described. The AI devices 2310a to 2310e shown in FIG. 23 can be seen as specific embodiments of the AI device 2200 shown in FIG. 22.

The present disclosure can have various advantageous effects.

For example, gNB-CU can properly and dynamically perform changing the MBS service areas based on the UEs' and/or DUs' feedback information. Therefore, the radio resource for multicast/broadcast can be used efficiently, and also the multicast service can be more accurate for the proper UEs.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a distributed unit (DU), the method comprising:
receiving, from a central unit (CU), an identity (ID) of a first multicast-broadcast service (MBS) area and a configuration for the first MBS area,
wherein the configuration for the first MBS area comprises a list of cell IDs related to the first MBS area and a list of tracking area identities (TAIs) related to the first MBS area;
providing an MBS service to a plurality of wireless devices based on the configuration for the first MBS area;
receiving, from the plurality of wireless devices, feedback information for the first MBS area;
transmitting, to the CU, a first message comprising the ID of the first MBS area and information obtained from the feedback information for the first MBS area;
receiving, from the CU, a second message for requesting a change of an MBS area from the first MBS area to a second MBS area,
wherein the second message comprises an ID of the second MBS area and a configuration for the second MBS area, and
wherein the configuration for the second MBS area comprises a list of cell IDs related to the second MBS area and a list of TAIs related to the second MBS area; and
providing the MBS service based on the configuration for the second MBS area.

2. The method of claim 1, wherein the feedback information comprises at least one of:
hybrid automatic repeat request (HARQ) acknowledgement (ACK)/negative-ACK (NACK) information for a transmission of the MBS service;
ACK/NACK information of radio link control (RLC) bearer for the transmission of the MBS service; or
channel state information (CSI) or reformed CSI on a channel related to the MBS service.

3. The method of claim 1, wherein the first MBS area is changed to the second MBS area based on the information obtained from the feedback information for the first MBS area.

4. The method of claim 1, wherein the information obtained from the feedback information for the first MBS area comprises at least one of:
a number of received negative acknowledgements (NACKs) in the first MBS area;
a number of failed transmissions in the first MBS area;
an average NACK probability in the first MBS area;
packet drop rate in the first MBS area;
channel state information (CSI) or reformed CSI on a channel related to the MBS service in the first MBS area;
a radio utilization efficiency for the first MBS area; or
a location information of wireless devices in the first MBS area.

5. The method of claim 4, wherein the first MBS area is changed to the second MBS area based on the number of received NACKs increasing or being more than a configured threshold.

6. The method of claim 4, wherein the first MBS area is changed to the second MBS area based on a channel quality in the CSI decreasing or being lower than a configured threshold.

7. The method of claim 4, wherein the first MBS area is changed to the second MBS area based on a radio utilization efficiency or total amount of radio resources for MBS service decreasing or being lower than a configured threshold.

8. The method of claim 4, wherein the first MBS area is changed to the second MBS area based on the location information of the wireless devices indicating that the MBS service can be covered by a smaller number of cell IDs or TAIs.

9. The method of claim 1, further comprising:
transmitting, to the plurality of wireless devices, the configuration for the first MBS area; and
transmitting, to the plurality of wireless devices, the configuration for the second MBS area.

10. The method of claim 1,
wherein the first MBS area and the second MBS area are determined among MBS areas supported by the DU based on MBS related information, and
wherein the MBS related information comprises at least one of a service identity, MBS tunnel endpoint identifier (TEID), multicast address or MBS flow identity.

11. A distributed unit (DU) comprising:
a transceiver;
a memory; and
at least one processor operatively coupled to the transceiver and the memory,
wherein the memory stores instructions that, based on being executed by the at least one processor, perform operations comprising:
receiving, from a central unit (CU), an identity (ID) of a first multicast-broadcast service (MBS) area and a configuration for the first MBS area,
wherein the configuration for the first MBS area comprises a list of cell IDs related to the first MBS area and a list of tracking area identities (TAIs) related to the first MBS area;
providing an MBS service to a plurality of wireless devices based on the configuration for the first MBS area;
receiving, from the plurality of wireless devices, feedback information for the first MBS area;
transmitting, to the CU, a first message comprising the ID of the first MBS area and information obtained from the feedback information for the first MBS area;
receiving, from the CU, a second message for requesting a change of an MBS area from the first MBS area to a second MBS area,
wherein the second message comprises an ID of the second MBS area and a configuration for the second MBS area, and
wherein the configuration for the second MBS area comprises a list of cell IDs related to the second MBS area and a list of TAIs related to the second MBS area; and
providing the MBS service based on the configuration for the second MBS area.

12. A method performed by a wireless device, the method comprising:
receiving, from a distributed unit (DU), a transmission of a multicast-broadcast service (MBS) service based on a configuration for a first MBS area,
wherein the configuration for the first MBS area is related to an identity (ID) of the first MBS area, and comprises a list of cell IDs related to the first MBS area and a list of tracking area identities (TAIs) related to the first MBS area;

transmitting, to the DU, feedback information for the first MBS area,
wherein a first message comprising the ID of the first MBS area and information obtained from the feedback information for the first MBS area is transmitted from the DU to a central unit (CU),
wherein a second message for requesting a change of an MBS area from the first MBS area to a second MBS area is transmitted from the CU to the DU,
wherein the second message comprises an ID of the second MBS area and a configuration for the second MBS area, and
wherein the configuration for the second MBS area comprises a list of cell IDs related to the second MBS area and a list of TAIs related to the second MBS area; and
receiving, from the DU, a transmission of the MBS service based on the configuration for the second MBS area.

* * * * *